US012561431B1

(12) United States Patent

Chou

(10) Patent No.: US 12,561,431 B1

(45) Date of Patent: Feb. 24, 2026

(54) RECOVERING FROM A RANSOMWARE ATTACK USING COMPUTATIONAL INTELLIGENCE

(71) Applicant: Nubeva, Inc., San Jose, CA (US)

(72) Inventor: Randy Yen-Pang Chou, San Jose, CA (US)

(73) Assignee: Nubeva, Inc., San Jose, CA (US)

( * ) Notice: Subject to any disclaimer, the term of this patent is extended or adjusted under 35 U.S.C. 154(b) by 54 days.

(21) Appl. No.: 18/902,910

(22) Filed: Sep. 30, 2024

(51) Int. Cl.
  *G06F 21/55* (2013.01)
  *H04L 9/14* (2006.01)

(52) U.S. Cl.
  CPC .............. *G06F 21/554* (2013.01); *H04L 9/14* (2013.01); *G06F 2221/034* (2013.01)

(58) Field of Classification Search
  CPC ................................. G06F 21/554; H04L 9/14
  See application file for complete search history.

(56) References Cited

U.S. PATENT DOCUMENTS

| | | | | |
|---|---|---|---|---|
| 10,229,269 | B1 * | 3/2019 | Patton | G06F 21/554 |
| 10,447,671 | B1 * | 10/2019 | Meckl | G06F 12/1408 |
| 12,058,169 | B1 * | 8/2024 | Brandwine | H04L 63/1425 |
| 12,248,574 | B1 * | 3/2025 | McMillan, Jr. | G06F 21/566 |
| 2018/0048658 | A1 * | 2/2018 | Hittel | H04L 63/1433 |
| 2018/0114020 | A1 * | 4/2018 | Hirschberg | G06F 21/566 |
| 2018/0248896 | A1 * | 8/2018 | Challita | G06F 21/554 |
| 2019/0018961 | A1 * | 1/2019 | Kostyushko | H04L 9/002 |
| 2019/0108340 | A1 * | 4/2019 | Bedhapudi | G06F 21/554 |
| 2019/0180028 | A1 * | 6/2019 | Seo | G06F 21/602 |
| 2020/0082084 | A1 * | 3/2020 | Kallos | G06F 21/568 |
| 2020/0279043 | A1 * | 9/2020 | Thornton | G06N 5/022 |
| 2021/0026961 | A1 * | 1/2021 | Underwood | G06F 16/9027 |
| 2022/0222074 | A1 * | 7/2022 | Rath | G06F 11/0757 |
| 2024/0354395 | A1 * | 10/2024 | Baumgarten | G06F 21/44 |
| 2025/0094579 | A1 * | 3/2025 | Rossman | G06F 21/554 |
| 2025/0126121 | A1 * | 4/2025 | Ueki | H04L 63/10 |
| 2025/0298892 | A1 * | 9/2025 | Shahriar | G06F 21/554 |
| 2025/0348585 | A1 * | 11/2025 | Sun | G06N 20/00 |
| 2025/0356008 | A1 * | 11/2025 | Tan | G06F 21/56 |

OTHER PUBLICATIONS

Kolodenker et al., PayBreak: Defense Against Cryptographic Ransomware, 2017 (Year: 2017).*
Continella et al., ShieldFS: a self-healing, ransomware-aware filesystem, 2016 (Year: 2016).*

* cited by examiner

*Primary Examiner* — Hieu T Hoang
(74) *Attorney, Agent, or Firm* — Mark D. Spiller

(57) ABSTRACT

The disclosed embodiments disclose techniques for recovering from a ransomware attack using computational intelligence. During operation, a monitoring system detects that a ransomware attack has encrypted multiple subsections of a data storage that is simultaneously being accessed by multiple processing units, and receives a set of encryption keys that were harvested for the multiple processing units. The system analyzes the contents of the data storage to determine a pattern in the multiple subsections that have been encrypted, and then uses the encryption keys and the pattern to decrypt the multiple encrypted subsections.

13 Claims, 13 Drawing Sheets

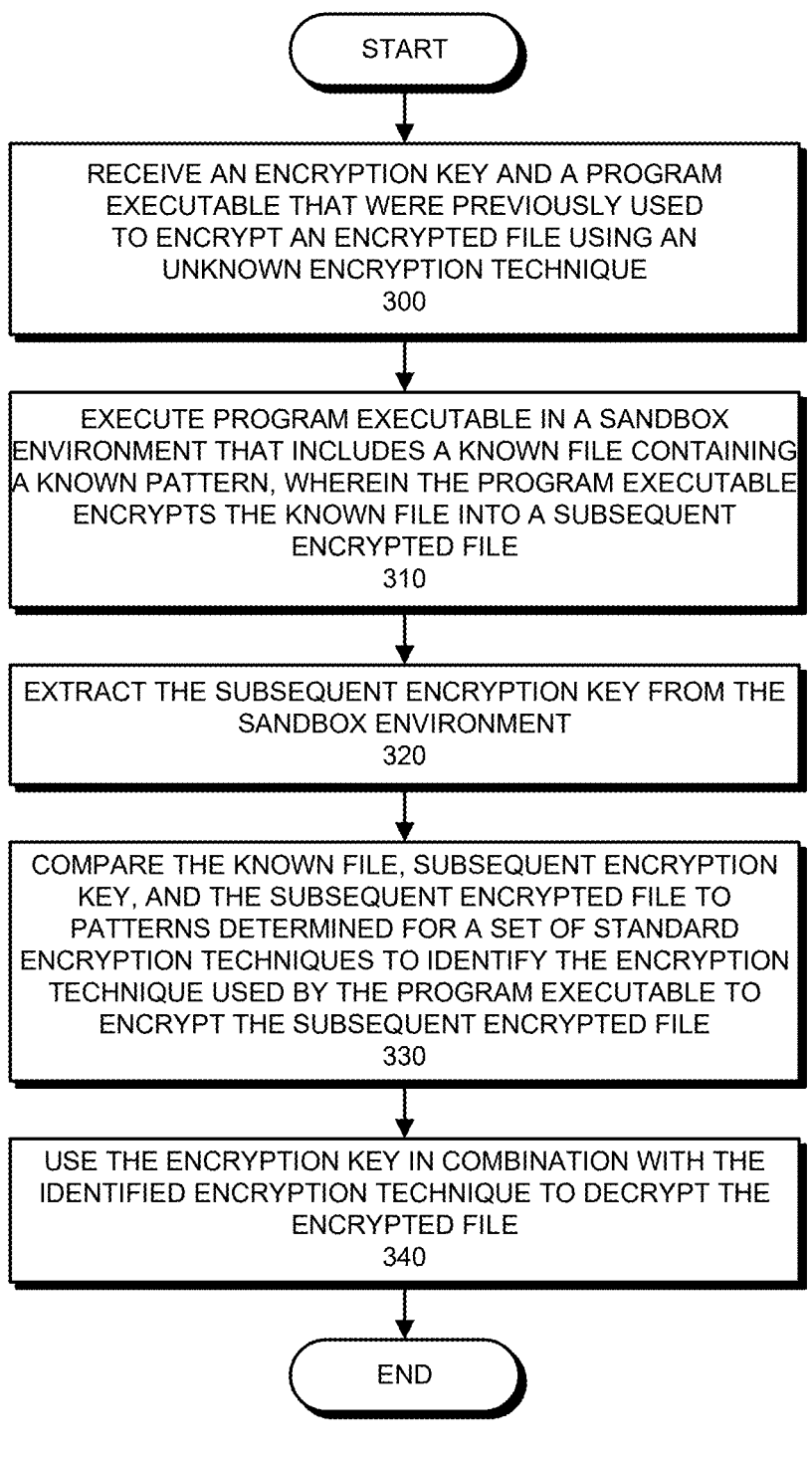

START

RECEIVE AN ENCRYPTION KEY AND A PROGRAM
EXECUTABLE THAT WERE PREVIOUSLY USED
TO ENCRYPT AN ENCRYPTED FILE USING AN
UNKNOWN ENCRYPTION TECHNIQUE
300

EXECUTE PROGRAM EXECUTABLE IN A SANDBOX
ENVIRONMENT THAT INCLUDES A KNOWN FILE CONTAINING
A KNOWN PATTERN, WHEREIN THE PROGRAM EXECUTABLE
ENCRYPTS THE KNOWN FILE INTO A SUBSEQUENT
ENCRYPTED FILE
310

EXTRACT THE SUBSEQUENT ENCRYPTION KEY FROM THE
SANDBOX ENVIRONMENT
320

COMPARE THE KNOWN FILE, SUBSEQUENT ENCRYPTION
KEY, AND THE SUBSEQUENT ENCRYPTED FILE TO
PATTERNS DETERMINED FOR A SET OF STANDARD
ENCRYPTION TECHNIQUES TO IDENTIFY THE ENCRYPTION
TECHNIQUE USED BY THE PROGRAM EXECUTABLE TO
ENCRYPT THE SUBSEQUENT ENCRYPTED FILE
330

USE THE ENCRYPTION KEY IN COMBINATION WITH THE
IDENTIFIED ENCRYPTION TECHNIQUE TO DECRYPT THE
ENCRYPTED FILE
340

END

FIG. 3

COMPUTING ENVIRONMENT  400

RECOVERING FROM A RANSOMWARE ATTACK USING COMPUTATIONAL INTELLIGENCE

BACKGROUND

Field of the Invention

This disclosure generally relates to techniques for monitoring computing devices to detect, prevent, and recover from unauthorized behavior. More specifically, this disclosure relates to recovering from encryption attacks.

Related Art

Mobile devices, high-speed networks and cloud computing have led to distributed enterprise environments in which a majority of users work remotely from the company headquarters and access cloud-based applications. Unfortunately, traditional security practices that leverage physical access to computing devices and networking infrastructure to monitor user and application behavior become inadequate in such distributed environments. As the number of cloud-based services, requests, and data transfers grow, ensuring that vital enterprise data is protected from leaks or other malicious actions becomes increasingly difficult, which can leave an enterprise vulnerable. Furthermore, the use of encryption techniques for data storage and encryption-based attacks can lead to additional enterprise vulnerabilities.

Ransomware attacks are a type of malware attack in which an attacker infects a target computing device and permanently blocks access to data stored on the target computing device until the victim pays a ransom, at which point the attacker provides a mechanism to restore the data. Ransomware attacks are often encryption-based, with the attacker providing a decryption key and/or program after the ransom is received. Such attacks can seriously disrupt the operation of targeted organizations.

Hence, what is needed are techniques for providing monitoring and recovery solutions without the above-described problems of existing techniques.

SUMMARY

The disclosed embodiments disclose techniques for recovering from a ransomware attack using computational intelligence. During operation, a monitoring system detects that a ransomware attack has encrypted multiple subsections of a data storage that is simultaneously being accessed by multiple processing units, and receives a set of encryption keys that were harvested for the multiple processing units. The system analyzes the contents of the data storage to determine a pattern in the multiple subsections that have been encrypted, and then uses the encryption keys and the pattern to decrypt the multiple encrypted subsections.

In some embodiments, the data storage is a virtual machine disk image hosted by a computing device. This virtual machine disk image is too large to be encrypted as one unit and hence is encrypted in the multiple subsections by the ransomware attack.

In some embodiments, the data storage comprises a filesystem with a known filesystem header. This filesystem is sparsely populated and hence comprises primarily unwritten, zeroed-out data values. Determining the pattern involves identifying encrypted writes in zeroed-out portions of the data storage to pinpoint a length of encrypted subsections and an interval between encrypted subsections.

In some embodiments, determining the pattern involves submitting queries to a computational intelligence and executing program instructions in the query responses to efficiently analyze the contents of the data storage and determine the length and the interval.

In some embodiments, it is not possible to determine the processing unit that executed the ransomware attack. Decrypting the encrypted subsections of the data storage involves determining that the known filesystem header has been encrypted and then testing the set of encryption keys to decrypt the encrypted filesystem header individually to determine if the encrypted multiple subsections of the data storage were encrypted only once using a single encryption key.

In some embodiments, decrypting the encrypted subsections of the data storage involves determining that the encrypted filesystem header was not encrypted using any single encryption key and that multiple instances of ransomware simultaneously encrypted one or more of the multiple subsections. Combinations of keys from the set of encryption keys are tested to decrypt the encrypted filesystem header and the multiple subsections.

In some embodiments, testing combinations of keys involves submitting the set of encryption keys and the encrypted filesystem header to a computational intelligence in a query to determine a set of decryption techniques that can decrypt the encrypted subsections.

In some embodiments, efficiently testing combinations of keys involves assuming that the same ransomware attack attacked the data storage from two or more of the multiple processing units using the same encryption technique. The decryption system prioritizes testing for multiple instances of the same decryption technique in attempts to decrypt the encrypted filesystem header to reduce the number of iterations of decryption attempts.

In some embodiments, testing combinations of keys further involves prioritizing the Chacha and AES-GCM decryption techniques in decryption attempts.

In some embodiments, testing combinations of keys from the set of encryption keys involves XORing two or more candidate keys together to test decrypting the encrypted filesystem header.

In some embodiments, a first subset of the set of multiple keys successfully decrypt an initial portion of the encrypted multiple subsections but do not successfully decrypt a subsequent portion of the encrypted multiple subsections. The decryption system tests an assumption that one instance of the ransomware attack may have terminated early and tests the keys of the first subset at least one of individually or in subsequent subsets to decrypt the subsequent portion.

BRIEF DESCRIPTION OF THE FIGURES

FIG. 3 presents a flow chart that illustrates the process of decrypting an encrypted file to recover from a ransomware attack in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed.

When the hardware modules are activated, the hardware modules perform the methods and processes included within the hardware modules.

Techniques for Thwarting and/or Recovering from Ransomware Attacks

Ransomware attacks are a type of malware attack in which an attacker infects a target computing device and permanently blocks access to data stored on the target computing device until the victim pays a ransom, at which point the attacker provides a mechanism to restore the data. Ransomware attacks are often encryption-based, with the attacker providing a decryption key and/or program after the ransom is received.

Figure 1:
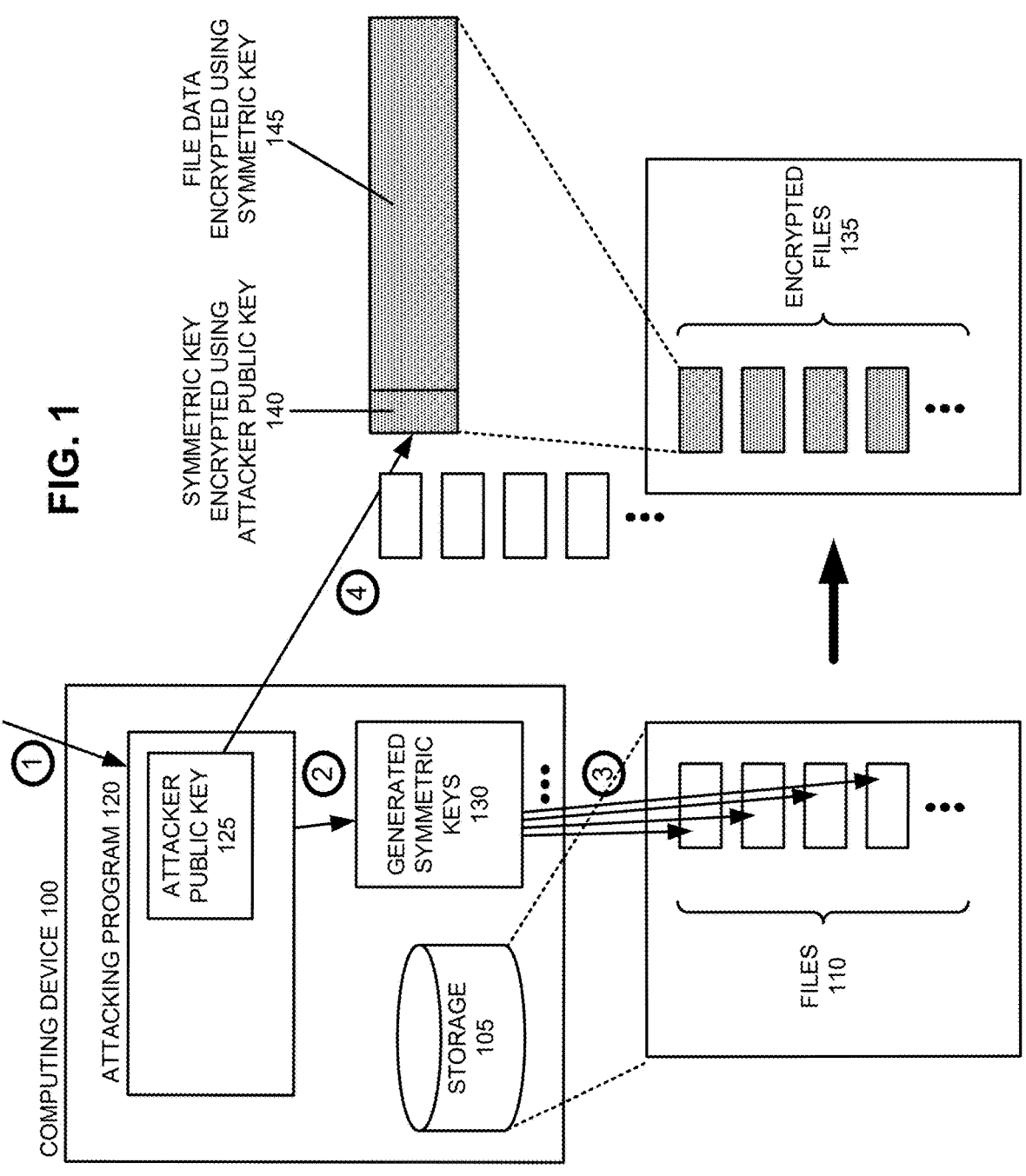
FIG. 1 illustrates an exemplary ransomware attack in accordance with an embodiment.

FIG. 1 illustrates an exemplary ransomware attack in which a computing machine 100 is compromised via some vulnerable backdoor (operation 1) that allows an attacking program 120 to execute with escalated privileges. Attacks may take advantage of a range of vulnerable backdoors, including but not limited to: known application or operating system vulnerabilities, weak passwords, compromised managed service providers (MSPs), infected file downloads, and malicious emails or websites. Regardless of the specific vulnerability that was exploited to gain entry to computing device 100, attacking program 120 upon execution proceeds to encrypt some or all of the files 110 stored in one or more storage mechanisms (e.g., storage 105) that are available on (or otherwise accessible by) computing device 100. After replacing files 110 with encrypted files 135, attacking program 120 may then post a notification indicating that the files and have encrypted, and require a ransom be paid to restore (unencrypt) the files. For example, attacking program 120 may change the file extension of encrypted files and change the background of a display screen to indicate the attack to users and specify ransom requirements.

The success of a ransomware attack (from the attacker's viewpoint) typically depends on the attacked party being unable to recover their files without paying the required ransom. Towards this end, the attacking program 120 typically is configured to disable and/or delete all file backups and any snapshot or recovery mechanisms that may be available on computing device 100. For instance, attacking program 120 may be configured to disable enterprise storage capabilities by turning off active directory snapshots and backups, and then also subsequently attack all writable network drives and any other vulnerable computing devices that can be contacted. Attacking program 120 is configured to use encryption techniques that operate quickly to encrypt large volumes of data (thereby reducing the time in which the attack can be detected and halted) while also making it difficult for users of computing device 100 to decrypt the encrypted files 135 without paying the ransom. Asymmetric encryption techniques generally provide stronger encryption but also involve substantially higher computation. Hence, in many scenarios attacking programs use a combination of symmetric and asymmetric encryption to achieve their objectives.

In the example of FIG. 1, the attacking program 120 deployed to computing device 100 includes an attacker public key 125, but does not include the corresponding attacker private key. When encrypting files 110, attacking program 120 can perform fast bulk encryption by randomly generating one or more symmetric keys 130 (operation 2) (e.g., a different symmetric key for each target file), encrypting each target file using a distinct symmetric key (operation 3), and then using the attacker's public key 125 to asymmetrically encrypt the distinct symmetric key for each given target file (operation 4). Hence, each specific encrypted file includes a set of file data that has been symmetrically encrypted using a given symmetric key 145 and a copy of the symmetric key 140 that has been asymmetrically encrypted using the attacker public key 125. Such techniques combine the benefits of (faster) symmetric encryption and the security of asymmetric encryption, and are similar to techniques that encrypt email using S/MIME encryption techniques. Generating a different symmetric key for each file being encrypted (or some other specified granularity) increases security by reducing the benefit of cracking any individual symmetric key. These techniques also enable scalably encrypting a data portion for different targets by allowing a data portion to be encrypted with a single symmetric key and then attaching multiple encrypted copies of that symmetric key that have been encrypted by the different public keys of multiple potential different recipients/targets; each additional recipient/target requires only a small amount of additional storage space (the size of the encrypted key), in contrast with encrypting a separate copy of the full data payload for each recipient. Multiple public keys could also be used to provide multiple tiers of ransomware; e.g., a small set of files could be tied to a first public key and could be decrypted by providing a first private key (as a gesture of good faith and/or proof that the ransom offer is genuine and that decryption is possible), while a bulk of the files would then be tied to a second public key that required payment of the ransom.

Note that at no point during the attack does computing device 100 have access to the private key that can decrypt the asymmetrically-encrypted symmetric keys that were used to encrypt files 110. The attacker only provides this private key to the victim after the required ransom has been paid. For instance, the victim may be required to send untraceable virtual currency to a specific network address, after which the attacking program (or a user of computing device 100) is automatically provided with the private key that complements attacker public key 125. This private key can then be used to decrypt the encrypted symmetric key for each of encrypted files 135, which can then be used in turn to decrypt the data contents of encrypted files 135. Note also that while the actual implementation details of a specific attack may differ slightly (e.g., perhaps using RSA+AES encryption vs elliptic-curve Diffie-Hellman encryption or other different variations, methods, or combinations of encryption techniques), a wide range of ransomware attacks follow this general format.

In some embodiments, monitoring and recovery techniques can be applied to detect, thwart, and/or recover from ransomware attacks. A ransomware attack may be thwarted in a range of manners, for example including but not limited to one or more of: (1) detecting illegitimate encryption operations; (2) halting detected encryption operations; (3) detecting and extracting encryption keys for encryption operations; and/or (4) providing a way to recover data modified during a ransomware attack without paying a demanded ransom.

In some embodiments, key extraction techniques are leveraged to thwart ransomware attacks. For instance, an encryption-monitoring service executing on a computing device may be configured to detect and track encryption operations that are initiated on the computing device, and upon detecting such operations extract the associated symmetric keys. These extracted symmetric keys can then be used to undo any nefarious encryption operations performed by ransomware. Note, however, that malware applications typically include their own encryption libraries (instead of leveraging known local system libraries), and hence may involve specialized detection and key extraction techniques.

In some embodiments, detecting encryption operations involves detecting unique characteristics and/or patterns that are typically associated with, and unique to, encryption operations. For example, standard stream ciphers (e.g., Salsa and ChaCha) typically heavily leverage sequences of add-rotate-XOR operations. While XOR operations are used for some other applications on computing devices (e.g., to facilitate displaying a mouse cursor on a device screen, or in some specialized math-oriented applications), the repetitive sequences of heavy XOR use in encryption are orders of magnitude higher than in any other typical applications. Hence, because XOR operations are seldomly otherwise used in the same degree, monitoring for frequent XOR operations facilitates detecting encryption operations. Note that an encryption-monitoring system can track executing processes to determine whether any known XOR-heavy math-oriented applications are executing, thereby reducing erroneous false encryption detection.

In some embodiments, detecting encryption operations involves detecting additional operations that provide substantially similar characteristics as XOR for encryption purposes. An encryption operation typically performs an operation (such as XOR) upon a data value and a random value to generate an encrypted result; repeating the operation (e.g., for XOR, performing a second XOR upon the random value and the encrypted value) restores the original data value. Other operations that have similar properties can be used to achieve substantially similar results. For instance, a set of addition and modulus operations (e.g., an add with carryover) can transform the data value into an encrypted value similarly to an XOR operation (e.g., in a manner that makes it difficult to determine the random value and the data value from the final result), and also satisfy the constraint in which performing the operation twice restores the original data value. Monitoring for repeated sets of such equivalent operations facilitates detecting encryption operations that attempt to evade XOR-based monitoring.

In some embodiments, detecting encryption operations involves statically analyzing program code at runtime. Malware program code is often obfuscated (e.g., encrypted and/or otherwise encoded), but needs to be decoded to be executed. An encryption-monitoring service can scan the assembly instructions that are being executed and performs static binary analysis to detect loops that execute a large number of target instructions (e.g., XOR instructions and/or other instructions with similar characteristics). For instance, executables with a large number of such operations can be compared with known executables of a variety of encryption techniques. For example, the service may extract the code in question, execute it using one or more known inputs, and then compare the resulting outputs to those of known encryption techniques for the same input/output vectors to determine if similar transformations are being applied. Encryption techniques such as AES, 3DES, and Chacha all have very specific and identifiable patterns that facilitate such identification techniques.

In some embodiments, detecting encryption operations involves detecting operations used for asymmetric encryption and leveraging an observation that asymmetric encryption typically precedes symmetric encryption. Asymmetric encryption typically involves specialized processor math operations upon very large numbers. More specifically, asymmetric encryption typically leverages specialized arbitrary-precision arithmetic CPU instructions (also referred to as "bignum instructions") that are geared towards optimizing operations upon values that have hundreds of digits; bignum instructions are usually indicators of asymmetric encryption (and likely subsequent symmetric encryption). For instance, RSA keys are typically 1024 bits or longer in length, which is substantially larger than the typical 32- or 64-bit values operated upon by processors. An encryption-monitoring service can detect such operations and then scan for subsequent related symmetric encryption operations for key-extraction purposes. Note that, as described above for detecting XOR operations, some math- or otherwise-specialized applications (e.g., MathCAD and MatLab) may also perform similar large-value operations; as described above, the encryption-monitoring system can detect and track the use of such applications to reduce false positives.

In some embodiments, an encryption-monitoring service detecting encryption operations analyzes the detected operations to determine the specific data and operations that are being used, and then tracks (and/or back-traces) the identified operations to determine the symmetric key that is being used. More specifically, during encryption bytes are typically combined and operated upon in a pattern, making it possible to analyze the operation being executed, and, based on the known operation of known stream and block encryption ciphers, reverse-engineer (and extract) the symmetric key that is being used. For example, an encryption-monitoring service monitoring for ransomware may look for a pattern in which a 32-byte value (or any other size value) is: (1) read and updated a large number of times in conjunction with a large number of XOR operations; (2) encrypted using asymmetric encryption operations; (3) stored into a file; and then (4) overwritten with zeros in memory (so that the value that was used cannot be recovered using subsequent memory analysis). Such a value is likely to be a symmetric key being used in a ransomware encryption operation, and can be extracted and preserved while it is being used (but only before it is overwritten!) for later recovery purposes. Hence, an encryption-monitoring service can use knowledge of typical encryption and ransomware operation patterns to detect such operations and extract keys. Note that these monitoring and extraction techniques leverage a set of operations that typically must be executed in a specific order to perform encryption using known encryption techniques. Developing new encryption techniques involves substantial time, overhead, and vetting, and is typically outside of the scope of typical malware/ransomware developers-hence, most ransomware attacks are likely to leverage known encryption techniques. Furthermore, the disclosed detection techniques can be extended as needed to detect any unique and/or repetitive operations inherent in future alternative encryption techniques.

In some embodiments, a known ransomware executable is analyzed to generate a meta-signature that characterizes the executable. Runtime static analysis that leverages this meta-signature can then be applied to subsequent suspicious executables. If such executables are indeed ransomware from the same family, the static analysis can generate a signature that provides extraction parameters that facilitate extracting encryption keys from the executing ransomware.

In some embodiments, keys can be extracted from various components of a computing device. For instance, in the context of the detected operations described above, some or all of an encryption key may be extracted from: program instructions; any level of the memory hierarchy, including but not limited to hard drives, solid state devices (SSDs), other storage mediums, volatile memory, non-volatile memory, processor caches; processor registers; and/or optical or electrical network transmissions.

In some embodiments, an encryption-monitoring service can leverage awareness of other legitimate encryption operations to distinguish ransomware. The preceding and following sections disclose techniques for extracting encryption keys from a range of different applications that incorporate encryption. A substantial majority of legitimate encryption operations are likely to be initiated by a relatively small set of applications, including: (1) encrypted communication, e.g. video conferencing applications (such as Zoom) and email; (2) TLS handshaking for network data accesses (e.g., via SSL); and (3) encrypted filesystem accesses (e.g., encrypted partitions, SMB filesystem encryption, etc.). Typically, any other legitimate encryption on a given computing device is likely to be otherwise quite limited, and generally legitimate encryption operations execute using known libraries that facilitate key extraction, as described above. A trusted encryption-monitoring service that monitors all legitimate encryption operations can leverage the previously-described triggering and extraction techniques to identify those legitimate encryption operations, and determine whether a detected encryption operation is known/legitimate or unknown (and hence potentially malicious). For instance, the disclosed techniques may involve tracking the set of processes that have previously executed on a computing device, and then monitoring and/or flagging encryption operations that are associated with executing processes that have not been previously detected on the computing device.

Note that the disclosed encryption-monitoring service is distinct from anti-virus monitoring techniques, which typically attempt to match the characteristics of executing programs to known malware program signatures to detect viruses. Malware constantly evolves, and the newest iterations (e.g., the REvil ransomware) are highly customizable, allowing a user to easily change configuration parameters so that the attack program executable has a different signature that cannot easily be identified by the set of previously-known antivirus signatures. This customizability makes modern ransomware difficult to detect and prevent by anti-virus services. However, because underlying encryption techniques (whether used by ransomware or legitimate applications) involve fairly regular, intense, and identifiable computation, such operations are difficult to hide or obfuscate. Hence, by focusing on such encryption operations an encryption-monitoring service that specifically monitors encryption indicators (and can differentiate legitimate from suspicious instances) can detect ransomware that signature-based anti-virus services cannot.

In some embodiments, an encryption-monitoring service is configured to execute as a trusted module on a computing device to prevent being disabled by malware. For instance, the encryption-monitoring service may be executed as a trusted driver in an operating system kernel or via a hypervisor. Note that the above-described encryption-monitoring techniques can be performed with relatively low overhead; such techniques do not involve frequently scanning data files (as required by traditional anti-virus scans), and hence do not increase filesystem load. Modern computing architectures typically include a large number of (often-idle) processor cores and SSD drives—while these resources unfortunately enable ransomware to very quickly encrypt files, they also facilitate actively monitoring files and operations with much lower discernible overhead/delay than in previous generations of systems. For instance, an encryption-monitoring service may detect and analyze encryption operations by triggering off of specific instructions, leveraging processor instruction-tracking metrics, and performing code analysis on executing code.

Figure 2A:
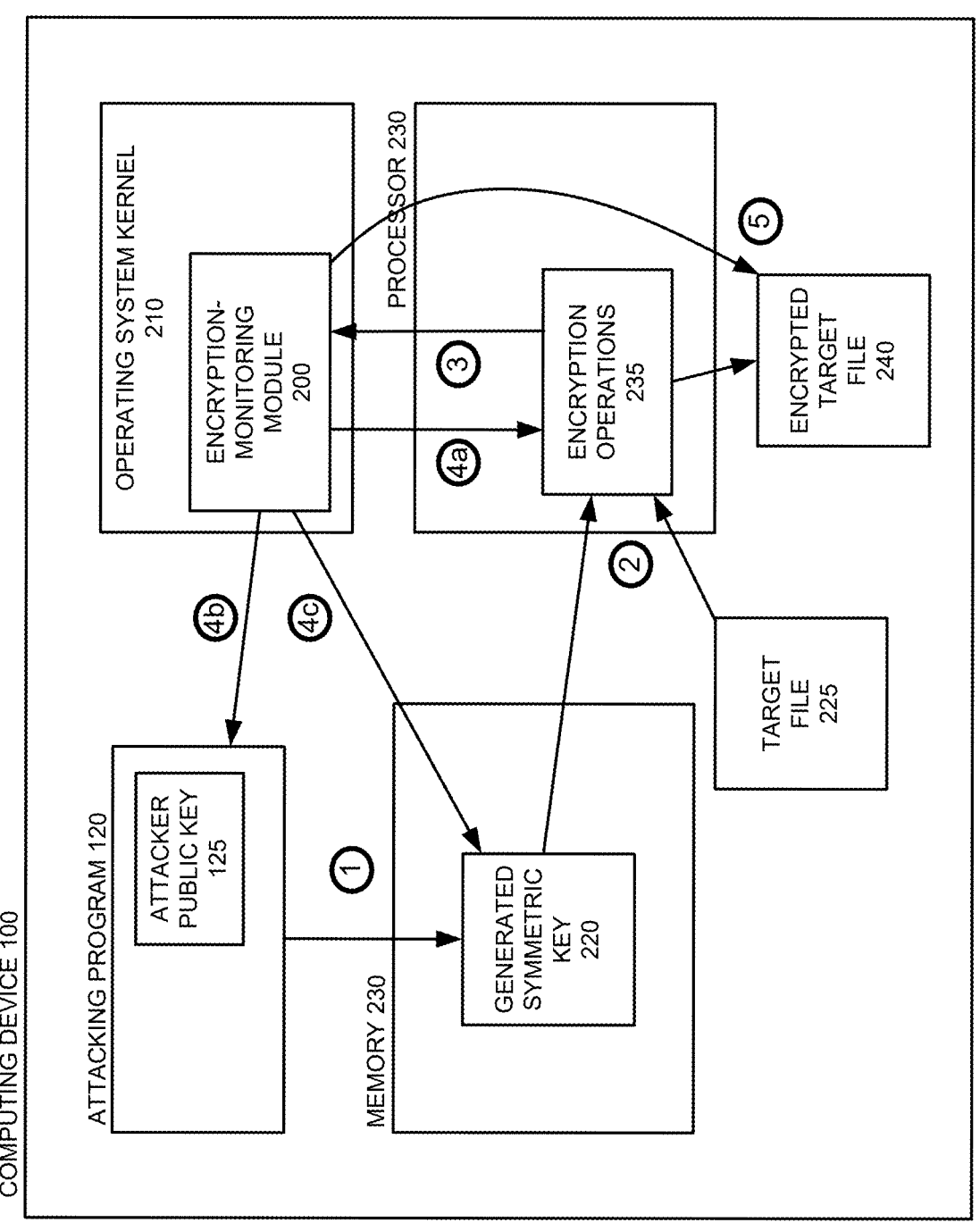
FIG. 2A illustrates an exemplary scenario in which an encryption-monitoring module tracks encryption operations in accordance with an embodiment.

FIG. 2A illustrates an exemplary scenario in which an encryption-monitoring module 200 executing in the operating system kernel 210 of computing device 100 tracks encryption operations. For instance, encryption-monitoring module 200 may set up a set of instruction callback triggers and other triggering and/or monitoring mechanisms in operating system kernel 210 and processor 230. At some point in time, malicious attacking program 120 gains access to computing device 100 and begins executing its ransomware attack by generating a symmetric key 220 (operation 1) that is then used to encrypt target file 225 (operation 2); generated symmetric key 220 needs to be available during the encryption of target file 225, and hence remains persistent in memory 230 while target file 225 is being encrypted. Triggering mechanisms for processor 230 alert encryption-monitoring module 200 to the encryption operations 235 for target file 225 (operation 3); for instance, encryption-monitoring module 200 may be triggered by a large number of XOR operations that are associated with encryption operations 235. Encryption-monitoring module 200 then analyzes encryption operations 235 (operation 4a) and attacking program 120 (operation 4b) to determine the location and value of generated symmetric key 220 in memory 230 (operation 4c). Encryption-monitoring module 200 extracts generated symmetric key 220 so that it can then be used subsequently to decrypt the encrypted version of the target file 225 (operation 5).

Note that encryption monitoring can be performed for a range of architectures and configurations. For example, in shared and/or parallelized computing environments, anti-malware applications are often executed at the hypervisor level instead of on a per-VM (virtual machine) level, to reduce the risk of being disabled and to reduce the resources consumed by each individual VM. Hence, in some embodiments, encryption monitoring may execute either at the hypervisor level or in one or more dedicated (and protected) VMs that respond to defined trigger events in other VMs and/or otherwise monitor the operation of the other VMs. For instance, monitored VMs may be configured with virtualized drivers and/or triggered call-backs that facilitate instruction tracking, accessing VM memory, and monitoring filesystem operations.

Figure 2B:
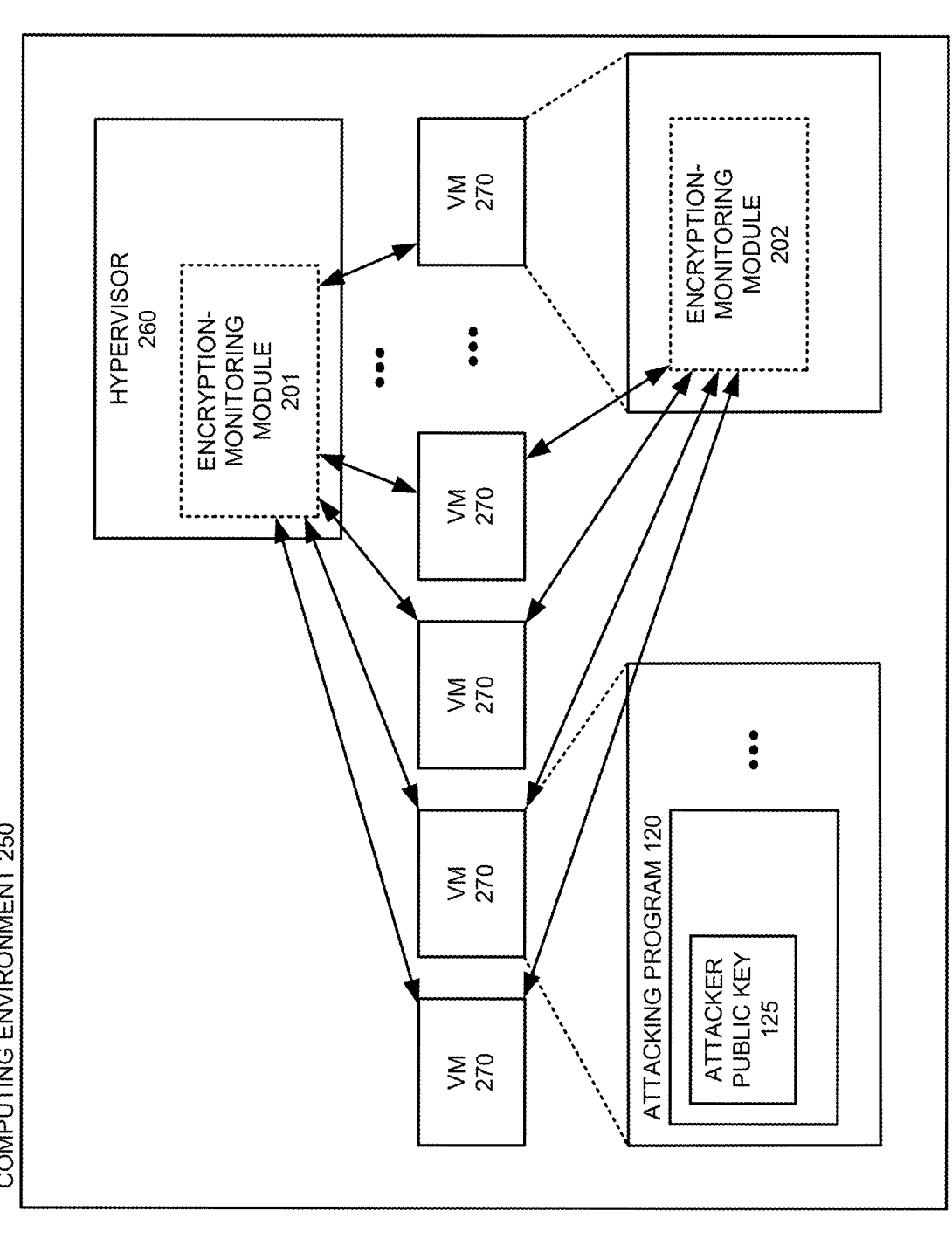
FIG. 2B illustrates encryption-monitoring in an alternative computing environment in which a hypervisor manages a number of VMs in accordance with an embodiment.

FIG. 2B illustrates an alternative computing environment 250 in which a hypervisor 260 manages a number of VMs 270. Hypervisor 260 may be limited to a single computing device or span multiple computing devices in a cluster and/or cloud computing environment. Encryption monitoring may be performed at the hypervisor level (e.g., as illustrated by encryption-monitoring module 201) or may be instantiated on one or more allocated VMs (e.g., as illustrated by encryption-monitoring module 202) that monitor encryption operations that occur on multiple other VMs. Note that encryption monitoring is not limited to the illustrated configurations; the disclosed encryption-monitoring techniques can be applied flexibly to any computing environment that leverages encryption.

Note that a monitoring service can also execute purely in user space (e.g., not only in an operating system kernel). Many modern operating systems include a kernel component that allows administrators to enlist specific user space services that cannot be killed. For instance, attempts to kill such protected user space services can trigger an operating system fault and crash. Operating system vendors may also obfuscate such modules and/or otherwise make it difficult to modify such modules without being detected.

While many anti-malware applications seek to block malware from reaching and executing on a computing device, some embodiments of the disclosed techniques follow a different model. In contrast, such embodiments may not seek to prevent malware (such as ransomware) from executing, but instead: (1) detect malware execution by detecting associated encryption operations; and (2) facilitate post-attack recovery by extracting the keys for the encryption operations. One beneficial aspect of the disclosed techniques is that the creator of the ransomware attack gains minimal feedback about the operation and outcome of the attack. A ransomware creator is only informed that a ransomware attack has succeeded if ransom is received; lack of ransom receipt provides very little information about whether the attack succeeded of failed. For instance, reasons for not receiving a ransom might include: (1) the lack of a vulnerable attack vector into the target; (2) that something blocked the ransomware from executing (e.g., anti-malware on the target device); (3) the victim having access to a snapshot mechanism that could not be disabled and immediately restored affected files; and (4) the attack succeeded but the victim refused to pay a ransom and hence accepted the data loss. The disclosed techniques add another option to this list—(5) the attack succeeded, but the victim was able to restore the data using extracted keys. The disclosed techniques do not return any status information to the attacker, thereby preventing the attacker from leveraging feedback to iteratively refine and adjust attacks. Hence, by preventing the attacker from detecting if recovery was achieved (and if so, how) the disclosed techniques help to interfere with the attacker's development cycle.

In some embodiments, a ransomware attack may be configured to provide feedback to the attacker by including an external indication of success. For instance, the attack may be configured to rewrite publicly-accessible files (e.g., externally-visible HTML files) or send a signal to a pre-arranged network address when the attack has completed. The disclosed techniques are beneficial in this scenario as well, because the extraction of keys enables recovery after the attack has successfully completed—the attacker receives the indication that the attack succeeded, but does not know that the files could subsequently be recovered using the extracted keys, and hence may assume that the victim was affected but refused to pay ransom.

In some embodiments, the ability to recover from a ransomware as an undetectable post-process operation helps prevent threat actors from iterating against and learning about the recovery techniques. A common issue with preventative cybersecurity products that are available for purchase is that a threat actor can also purchase such systems and then use them to test their own ransomware. Every time a new update is released to remedy vulnerabilities, the attackers can apply the update and then in turn iterate their own development to find new variations and/or vulnerabilities. In contrast, post-process recovery techniques that are invisible to the attacker do not present this same vulnerability, because the attacker does not gain any information on whether the attack succeeded and attack iterations involve much higher overhead and inconvenience.

Note that ransomware may have a range of variations. For instance, one variation may attempt to overcome the disclosed techniques by avoiding encryption and instead transmitting data to a remote location that is controlled by the attacker and then deleting the data local on the victim. However, such attempts would typically still involve TLS encryption that would be detected by encryption-monitoring techniques, and could be detected and analyzed using the above-described techniques. Attacks that avoid encryption completely can in turn be detected and blocked by traditional network analysis and intrusion systems that analyze unencrypted traffic.

In some embodiments, the response to the detection of an unauthorized and/or suspicious encryption operation may vary. In some embodiments, an encryption-monitoring service (such as the encryption-monitoring modules of FIG. 2A-2B) that detects illegitimate encryption operations may be configured to notify specified parties and/or signal an alert, or potentially even suspend (e.g., sandbox) or halt the execution of a suspicious program performing encryption operations until the program has been approved by a user or administrator. Alternatively, the encryption-monitoring service may instead execute in the background, gathering keys as they are used (to facilitate later file recovery) but not otherwise interfering. In some embodiments, the encryption-monitoring service may additionally communicate all extracted keys to a storage device, database, and/or secure external device to ensure that they cannot be compromised or deleted by the attacking program. For instance, extracted keys may be stored in an external database and require multiple-party agreement before being released. For example, such a multi-party key extraction agreement may require agreement from a quorum of entities that include (but are not limited to): (1) the entity targeted by the ransomware; (2) the service provider providing the monitoring and extraction service; (3) the targeted entity's managed security service provider (MSSP); (4) a legal representative for the targeted entity; and (5) the targeted entity's insurance provider.

In some embodiments, an encryption-monitoring system may be configured to determine when a ransomware attack has completed, and then use the extracted keys to automatically decrypt the encrypted files to restore data access. Note, however that while the disclosed techniques facilitate detecting encryption operations, detecting the intent and extent of unknown and potentially never-before-encountered ransomware may not always be feasible. Hence, given an uncertainty that the monitoring system may not be able to detect whether the ransomware has finished executing and/or been removed, in alternative embodiments the encryption-monitoring system may instead be configured to simply extract and preserve the keys for all detected encryption operations and wait for specific instructions to perform any subsequent decryption. Separating detection/extraction from recovery facilitates performing a later recovery at a subsequent time when the computing device is known to be clean of malware and stable. For instance, a specialist may initiate recovery procedures after confirming that ransomware has successfully been removed from the system. At that time, the set of stored keys can be used to decrypt the encrypted files.

Recovering encrypted data using extracted keys may involve a range of decryption techniques (both for data encrypted by a ransomware attack as well as other encrypted data forms and/or streams of data for which keys have been extracted, as described elsewhere in this disclosure). Extracting one or more keys is a critical first step (without which subsequent steps may not be possible), but the subsequent steps may vary depending on what other accompanying information can be extracted during the key extraction process. For instance, in the case of symmetric keys, even if only the symmetric keys themselves can be recovered and nothing else, it is possible to try each symmetric key against every encrypted file and determine whether the output is gibberish or valid. Statistical analysis techniques can be used to determine the valid correspondence between each symmetric key and one or more encrypted files.

Many encryption techniques involve mixing a well-known value (often called an initialization vector (IV) or a Nonce—e.g., a Number used only ONCE) into the key. Nonces are values that are stored in clear text along with the encrypted data and are used to make it more difficult to brute force decrypt encrypted files without the key. In some embodiments, extraction techniques extract both the key that is being used as well as the nonce that is associated with the encryption operation, and track their association with each other. At encryption time, the monitoring technique involves searching for the nonce for an encrypted file or stream, and then later, based on the nonce-key association, using the associated key to decrypt the associated encrypted data. In some scenarios, the nonce for a file or stream is usually in a well-known position and/or order and in plain text, and hence can be readily identified. Hence, extracting and tracking nonces in addition to keys facilitates performing efficient decryption operations. In some configurations, encryption techniques may also add additional checks (e.g., known values such as eight zeros) into an encrypted file to facilitate ensuring that decryption is successful. If such check values are included, a decrypting process can (even without access to a nonce) check the decrypted data to confirm that the decrypted check portion matches the known value.

In some embodiments, a number of different response options for an encryption-monitoring service may be associated with a range of configuration options. In many scenarios, the disclosed encryption-monitoring techniques are only beneficial if the encryption-monitoring service is installed and active on a computing device at the time that it is being attacked by ransomware-attempting to extract keys on a computing device after a ransomware attack has already successfully encrypted all of the target files and wiped the symmetric keys from memory is futile without the attacker's private key or a weak/erroneous ransomware implementation. Hence, there is incentive to deploy and execute the encryption-monitoring service on as many devices as possible. In some embodiments, the encryption-monitoring service may be provided as a prepaid service and/or subscription. Alternatively, in some scenarios the encryption-monitoring service may be deployed as a post-paid insurance policy where it is widely installed free of charge, and a customer that has fallen victim to a ransomware attack only pays to receive the extracted keys after an attack has occurred. This second option provides a minimal up-front cost and a legal, affordable alternative to paying a (typically exorbitant) ransom.

In some embodiments, the disclosed techniques are combined with a set of system configuration policies that enhance encryption-monitoring techniques. For instance, computing devices may be configured with a policy that disables encryption techniques that have been identified to be weak and/or unusual (e.g., Salsa stream ciphers and non-standard AES modes). The disclosed techniques can then be used to identify, disable, and extract encryption keys for any encryption techniques that are not known and/or are identified as not being legitimate. For example, the above-described static analysis techniques can be used to determine if an encryption operation matches approved standards (e.g., AES CBC/CCM/GCM or Chacha20), and detect and reject encryption techniques that do not meet such standards. Such embodiments facilitate detecting ransomware attempts that attempt to adapt to the disclosed techniques by using non-standard encryption techniques. In such a configuration, an encryption-monitoring service could serve as a "crypto firewall" that ensures that only strong encryption is used for legitimate purposes and blocks/disarms any weak and malicious uses of encryption.

Note that, as described above, the disclosed techniques involve provisioning the encryption-monitoring service (and the previously-described triggering and key-extraction techniques) with privileged access rights on a computing device. These privileges allow the monitoring service to track all of the encryption operations for the computing device from a single point; while individual applications could be extended (with potentially substantial additional programming effort) to directly provide encryption keys to a monitoring system, such efforts would not work for malicious ransomware applications. Hence, the disclosed monitoring and extraction techniques encourage the use of encryption for beneficial purposes (e.g., enterprise security) while also ensuring that encryption cannot be used inappropriately or maliciously (e.g., by ransomware or to leak enterprise secrets).

In summary, embodiments of the present invention involve thwarting ransomware attacks by detecting ransomware-initiated encryption operations and extracting the symmetric keys that are being used. These techniques facilitate decrypting ransomed files without access to the attacker's asymmetric private key. An encryption-monitoring service on the attacked machine is able to retrieve symmetric keys as they are being used (and before they are encrypted and deleted), thereby enabling the victim to unencrypt their ransomed files without paying the ransom. Detecting and performing symmetric key intercepts upon ransomware can save enterprises and end-users substantial time, frustration, and money.

Identifying Harvested Key Types and Performing Decryption

The previous sections discloses a range of techniques that relate to detecting ransomware attacks. These techniques depend on harvesting encryption keys used by the ransomware for subsequent decryption operations-without harvested keys and/or sufficient data to recreate the keys used, decryption is typically impossible, e.g., either infeasibly computationally expensive or dependent on an error and/or the existence of a known vulnerability in the encryption technique. Unfortunately, while early generations of ransomware sometimes incorporated weak custom encryption techniques, most modern ransomware leverage strong, standards-based encryption techniques. However, even when possessing harvested encryption keys, determining the key type and performing decryption in a desired timeframe may be challenging due to institutional and logistical delays. Embodiments of the present invention comprise techniques for efficiently leveraging harvested keys to reduce the delay involved in recovering from a ransomware attack.

Consider an exemplary scenario in which an organization that has key-monitoring services active (e.g., on a pay-per-use basis via a key-monitoring vendor) has been infected by ransomware. Typically, an initial timeframe after infection and loss of file access may be spent on problem analysis and damage control, with organization executives attempting to determine the scope of infection, whether any backups are available, how to inform owners/investors, insurance coverage, liability/HIPAA issues, etc. If no monitoring services were installed and all recent backups were lost, most organizations with no other options would typically capitulate and pay a demanded ransom at this point. Alternatively, if monitoring services were active, after the initial delay the key-monitoring vendor would be brought in to try to recover; however, because considerable time may have elapsed during which all organization data has been inaccessible and all productivity has been lost, there is substantial pressure to get the organization operating again as soon as possible, either via recovering the key and decrypting quickly or capitulating to the ransom demand.

Unfortunately, while harvesting encryption keys provides a number of recovery options that would otherwise not be possible, mere possession of the encryption key that was used does not immediately provide a solution-successfully decrypting files after a ransomware attack involves implementing a decryptor that leverages the harvested key to decrypt the encrypted files. However, given that there are a wide range of available encryption techniques, each of which may have a number of parameters and options, it may not be readily apparent which specific encryption technique is associated with a harvested encryption key. Brute-force methods that involve trying every known permutation of common encryption techniques involve substantial time and effort. Hence, efficiently crafting such a decryptor often involves analyzing and reverse-engineering selective aspects of the ransomware to determine and/or understand how the key was applied in the context of the encryption. In some embodiments, initial forensic steps may include identifying which ransomware executable that was used, getting a copy of the ransomware executable, and determining how it is executed (e.g., a specific command-line key may be required to execute the ransomware; note also that the command used to execute the ransomware on other targets is also often encrypted between the infected host and subsequent targets, sometimes making the invocation command difficult to determine). Because ransomware typically is configured to remove all traces of itself (along with all accessible target backups) upon exit and then subsequently shut down the infected host, such information is typically no longer readily available on the target device. Reverse-engineering the specific encryption operations by analyzing the program instructions in the executable or tracing execution of the ransomware is feasible, but the executable may have been obfuscated and/or partially encrypted as well, and hence such analysis operations require skilled effort and can be extremely time-intensive. Another alternative is to re-execute the ransomware in a secure, closed ("sandboxed") computing environment to gather information about how it operates and propagates to other machines.

In some embodiments, executing a ransomware executable in a controlled, sandboxed environment facilitates determining characteristics of the underlying encryption techniques that are used by the ransomware to encrypt target files. To make such determinations more quickly and efficiently, the sandbox environment may comprise one or more virtual machines that are configured to limit the randomness (e.g., the variability of inputs) available to the encryption technique, thereby reducing the complexity of identifying the encryption technique. For example, ransomware may invoke a variety of system random-number-generator mechanisms while attempting to generate multiple random encryption keys and other related values. The sandbox environment (e.g., the hypervisor for a virtual machine executing the sandbox) can be configured to intercept and/or interrupt requests to such mechanisms and return a fixed, unchanging value (e.g., return the same fixed value for each request to ensure that the random number generator is no longer random), thereby making subsequent encryption operations performed by the ransomware more uniform and consistent (and hence easier to analyze). Specific operations and/or parameters that may be intercepted, modified and/or overridden include, but are not limited to: a system randomnumber-generator system call; pseudorandom functions often executed to generate further randomness (e.g., a "QueryPerformance" call that returns a snapshot of system CPU/ memory/resource usage, which can often be considered fairly random, or other similarly pseudorandom calls related to system resource usage, status, and/or configuration); a processor random-number-generator instruction; and any other system-related parameters or functions that provide randomness. These calls can be redirected by the sandbox environment into a monitoring mechanism that ensures that all encryption operations will generate the same encryption key.

In some embodiments, efficiently identifying a target encryption technique involves triggering ransomware encryption upon a set of regular input patterns in a controlled, sandboxed environment. For example, an infected virtual machine can be populated with a number of files with specific sizes and known content patterns that facilitate identifying encryption characteristics. Patterns may include (but are not limited to) all zeros, all ones, and/or a known pattern than changes every 16 or 32 bytes. File sizes may be fixed and uniform, and may also include specific characteristics (such as a prime number of blocks). As the ransomware executes, the operating system and/or hypervisor intercepts (as described above) select function calls and instructions to reduce actual execution randomness (and hence any substantial key variations). Key-harvesting techniques can also be executed in the sandbox to extract an encryption key that was generated and used as the ransomware encrypts the provided known files. Alternatively, because the sandboxed ransomware is being executed under the control of the hypervisor other memory inspection and/or harvesting techniques can be used to extract the encryption key. The resulting encrypted files can then be compared with their respective source files to gain insight into the encryption operation that was used. For instance, if the encrypted file size is the same as the source file size, this would indicate that the ransomware is performing some form of symmetric stream encryption (e.g., using a Chacha or AES technique). Alternatively, if the original file included a specific number of bytes and the resulting encrypted file is larger, this would imply that the encryption technique was neither Chacha nor AES counter mode.

In some embodiments, the inputs and outputs of a sandboxed encryption session are submitted to a machine-learning mechanism that leverages previously-encountered encryption data and/or patterns to identify the specific encryption technique that was used to create the submitted encrypted files. More specifically, the machine-learning mechanism receives (1) the input pattern files, (2) a symmetric encryption key that was harvested from the sandbox environment, and (3) the resulting encrypted files generated using the encryption key for the input pattern files. In some embodiments, the machine-learning mechanism may also receive parts or all of the ransomware executable. The machine-learning mechanism analyzes the inputs and then outputs the identification of one or more candidate encryption techniques and parameters. Note that even if a single exact match is not identified, narrowing down the set of possible encryption techniques to a small subset can substantially decrease the amount of time needed to find the exact match. In some embodiments, the machine-learning mechanism further can generate and provide decryption program instructions for the identified encryption techniques that use the harvested sandbox key to decrypt the encrypted files. The identified encryption techniques and parameters can then be tested upon the encrypted files from the sandbox using the harvested sandbox key to determine whether the encryption technique has been correctly identified-if the decrypted outputs are the same as the original known pattern files this confirms that the encryption technique and its parameters were correctly identified. The identified encryption technique and decryption code can then subsequently used with the original harvested key (from the original ransomware attack) to recover the encrypted files from that attack.

Figure 2C:
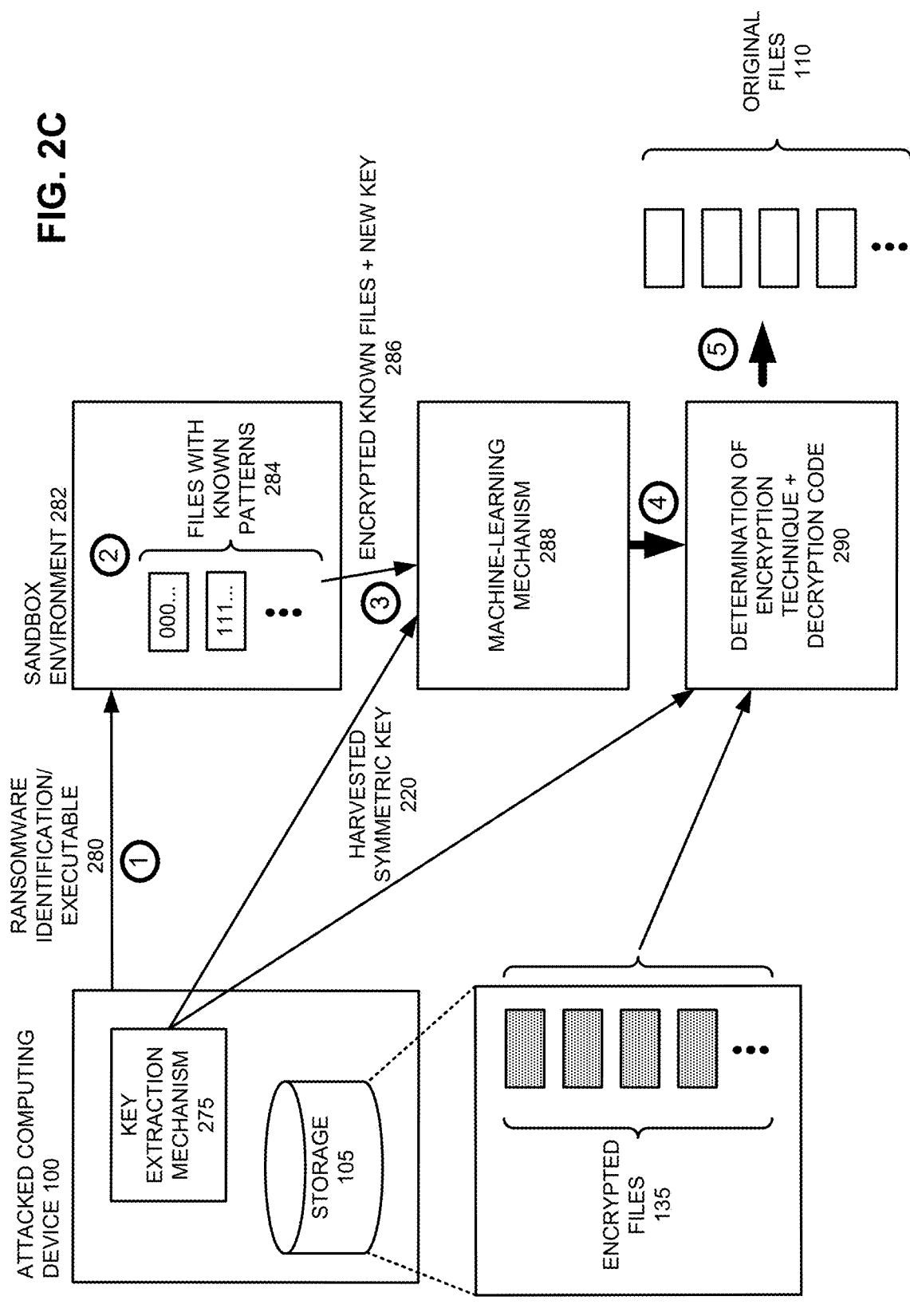
FIG. 2C illustrates an exemplary scenario in which a decryptor is generated following a ransomware attack in accordance with an embodiment.

Returning to the exemplary scenario with the infected organization above, the combination of the above-described techniques could comprise executing the identified ransomware in a controlled, sandboxed environment on a set of files with specified patterns, submitting the inputs and outputs to the machine-learning mechanism, and receiving identification of the encryption technique that was used and a decryptor for the encryption technique. This decryptor can then be used (in combination with the key harvested during the infection of the organization) to recover the original data from the encrypted files. FIG. 2C illustrates an exemplary scenario in which a decryptor is generated in response to the exemplary ransomware attack illustrated in FIG. 1. In the example of FIG. 2C, the files on attacked computing device 100 have already been encrypted 135 by the attacking ransomware. During the attack, a key-extraction mechanism 275 on device 100 was able to harvest the symmetric key 220 that was used to encrypt the files. A copy of the same ransomware executable 280 (and/or identifying information that can be used to determine the ransomware executable) is input into a sandbox environment 282 (operation 1), where the ransomware executable is executed in a controlled manner upon a set of files of known sizes containing a set of known and/or regular patterns 284 (operation 2). As described above, sandbox environment 282 is carefully controlled to ensure that the ransomware cannot be spread beyond its confines, and is configured to limit the randomness available to the executing ransomware to reduce the set of keys that are generated, thereby ensuring that the ransomware uses a (new) same key to encrypt known files 284. This sandbox key and the resulting encrypted pattern files 286 are then input to a machine-learning mechanism 288 (operation 3) that, based on analysis upon a set of training data, is able to determine the encryption technique that was used and/or generate a set of decryption program code 290 (operation 4). The output of machine-learning mechanism 288 is then used to create a decryptor that can be tested upon the encrypted known files using the new key. If the decryptor is confirmed to be correct, it can then be used in combination with the original harvested symmetric key 220 to decrypt encrypted files 135 (operation 5), thereby restoring access to the original files 1210 again.

The machine-learning mechanism can comprise a range of implementations and functionality. Many such implementations typically involve both an initial training phase and then a subsequent classification and/or generative phase (which may also involve ongoing adaptive learning). In some embodiments, the machine-learning mechanism comprises a trained classifier that leverages a deep neural network (DNN) to classify encryption techniques. For instance, the DNN can be trained using a training set that encompasses known encryption techniques and their parameters. For example, the training set may comprise keys, pattern files, and encrypted pattern files for a large set of (e.g., all known or standard) encryption techniques and parameters. During the training process the DNN's nodes are trained to cluster the different encryption techniques based on common features (e.g., patterns and characteristics) detected across respective sets of these three input parameters. Similar encryption techniques (or the same encryption technique executed with slightly different parameters) are likely to be clustered together by such analysis. During subsequent inference operations the resulting trained classifier can then be queried to classify inputs from target encryption techniques. During a query, the target inputs received by the trained classifier are evaluated and compared with the clusters detected in the training set, and the trained classifier outputs a classification for the target encryption method that indicates which previously-seen encryption method(s) shared the closest characteristics/patterns. The accuracy of the classification can then be tested using known decryptors for the identified method(s) and the target inputs. Note that in some embodiments the trained classifier is adaptive, and continues to train itself as it receives new inputs during queries; hence, the trained classifier can continue to adapt and train the nodes of the DNN to new patterns that are encountered over time using data included in subsequent queries.

In some embodiments, the machine-learning mechanism comprises a generative AI technique that analyzes a wide range of data for classification and/or pattern recognition purposes (e.g., the ChatGPT generative AI system). Generative AI techniques use neural networks to identify patterns and structures within existing data to generate new and original content. For instance, during training a generative AI may be configured to crawl the entire Internet gathering data, and may in the process traverse and learn readily-available open-source software repositories (e.g., GitHub), educational institutions (e.g., websites for college computer security courses), and other sources that include code, test files, and examples of encryption techniques, thereby gathering code for and learning patterns related to all of the commonly-used encryption techniques. Furthermore, the generative AI may also encounter training data related to ransomware as well (e.g., examples and patterns of ransomware executables, etc.). Subsequently, when the trained generative AI receives an encryption-related query the neural network that was trained based on the gathered and analyzed online data is applied to the specific query. Hence, in response to a query that includes an encryption key, a set of plain text files and a set of associated encrypted files, the generative AI can leverage the repositories of encryption techniques and cyphers that it has inspected to identify likely related patterns and associated context. For instance, the generative AI may detect a pattern that relates to the query, match the source of the pattern with a source that includes additional context related to the query (e.g., a website that includes examples that match the pattern of the input and encrypted files, where the website also includes example code for the technique that was used for those examples), and return that additional context in response to the query. As mentioned above for trained classifiers, generative AIs may also continue to train adaptively over time based on ongoing queries, results, and new sources that are found.

In some embodiments, multiple, related queries may be successively submitted to a machine-learning mechanism in a refined attempt to identify an encryption technique, with each successive query further narrowing down the set of possible encryption techniques. For instance, an initial attempt may submit the ransomware executable in a query to a generative AI that seeks to identify whether an encryption technique and parameters are known to be associated with that executable. If not, a subsequent query may submit a key, set of plaintext pattern files, and encrypted output files to the generative AI in an attempt to identify one or more candidate encryption techniques. Any queries that narrow down the set of potential encryption techniques aid in finding a decryptor more quickly. Once a reduced set of encryption techniques has been determined, a subsequent set of queries can then request that the generative AI generate a decryptor for any specific encryption techniques that were identified in the initial queries. These generated decryptors can then be applied to known key/file groupings to determine a successful decryption match; multiple exploratory decryption attempts can be executed very quickly, in parallel. For instance, if a set of initial queries determine that a ransomware is using a specific encryption protocol, Chacha20, which is a known standard but may range in the number of bits. A subsequent query to the generative AI may ask for a decryptor for every permutation of Chacha20, and then execute all of the received decryptor implementations to find a match. Note that in some embodiments, queries to a generative AI may be submitted in natural-language queries via an application API, allowing the submission of multiple, related queries and the testing of received results to be automated completely.

FIG. 3 presents a flow chart that illustrates the process of decrypting an encrypted file to recover from an encryption attack. During operation, a recovery system receives an encryption key and a program executable that were previously used to encrypt an encrypted file using an unknown encryption technique (operation 300). The program executable is executed in a sandbox environment that includes a known file containing a known pattern, which is subsequently encrypted by the executing program using a (newly-generated) subsequent key (operation 310). This subsequent key is extracted from the sandbox environment (operation 320). Characteristics of the known file, subsequent encryption key, and the encrypted known file are then compared to characteristics and patterns determined for a set of standard encryption techniques to identify the specific encryption technique used by the ransomware executable to encrypt the known file into the encrypted known file (operation 330). The knowledge of the identified encryption technique can then be used in combination with the original encryption key to decrypt the original encrypted file (operation 340).

Note that typically the most challenging aspect of performing a ransomware attack is not performing the encryption, but successfully penetrating a secure system to actually deploy and execute the ransomware. Similarly, the most challenging aspect of recovering from a ransomware attack and decrypting the ransomed data is not determining the encryption method that was used, but getting the encryption key that was used. With the key (as described for the disclosed techniques), building a decryptor is feasible given enough time and manpower, but potentially not in a timeframe that would prevent the affected entity from capitulating to the ransom. The techniques disclosed in this section combine with key-harvesting techniques to facilitate generating a decryptor quickly and automatically instead of manually, in a sufficiently rapid timeframe payment of the ransom can be avoided.

In some embodiments, recovery efforts may only have been able to capture some of the inputs to the key generation process and not an actual key itself. In such embodiments, the above-described machine-learning techniques may also be applied in an attempt to generate a range of keys that can then be tested against the encrypted (ransomed) data. More generally, machine-learning techniques may be used on whatever data is available in an attempt to leverage gathered patterns towards recovering from ransomware attacks.

Leveraging Large-Language Models to Detect Suspicious Encryption Behavior

Previous sections disclose a range of techniques that relate to detecting encryption operations based on typical encryption characteristics such as known encryption libraries, function calls, and operations. For instance, an encryption monitoring service can detect accesses to function calls that access known random number generators, or detect the heavy use of XOR instructions that are typically used during encryption. While such techniques may catch a certain set of ransomware, adversaries stymied by such techniques will continue to evolve their efforts and find ways to bypass such detection. For instance, while an encryption monitoring system may attempt to monitor typical entry points to the system random-number-generating techniques that are typically used to generate an encryption seed, an adversary that becomes aware of such monitoring techniques may find a way to bypass the monitoring by instead finding an alternative mechanism that leverages the randomness of user actions (e.g., typing rate, mouse motions, user movements, etc.) to generate a pseudorandom value in a manner that is much more difficult for a monitoring system to detect. Similarly, the monitoring of function calls to encryption libraries can be avoided by incorporating a stripped-down version of the encryption in the library. More specifically, an adversary may optimize known encryption code, remove an original set of traces/symbols, and then directly compile this adjusted version into the ransomware executable to bypass system function call monitoring. Given enough time, a human security expert can reverse-engineer ransomware executables to find such variations, but detecting and preventing attacks on an increasing number of computing devices is a time-consuming process that does not scale favorably purely based on the direct efforts of human experts.

The previous section disclosed a similar limitation on purely-human-based decryption efforts, where determining the correct decryption technique to decrypt ransomed data may be challenging in a needed timeframe even given a known harvested decryption key. Disclosed techniques reexecute ransomware in a controlled environment and then leverage a machine-learning mechanism to identify a matching encryption technique and quickly generate decryption code that can then decrypt the ransomed data with reduced direct human effort. In some embodiments, machine-learning mechanisms can similarly be leveraged to reduce the human effort required to identify more sophisticated encryption attacks.

Machine-learning techniques, large-language models (LLMs) and artificial intelligence (AI) techniques have improved substantially over the past years. Full-scale LLMs may include trillions of parameters and consume substantial computing resources, but recent efforts have created distilled LLM models (e.g., Meta AI's LLaMA models) that fit into the memory footprints of personal devices such as mobile phones and smart watches, and enable lightweight offline query lookups. Such LLM models incorporate training data from a number of online programming repositories, and hence are particularly suited for performing file analysis and generating encryption-related program code. Some embodiments of the present invention track queries submitted to an LLM to improve the adaptive encryption-monitoring capabilities of an encryption monitoring system (or "sensor").

Including an LLM in the sensor enables a user to send natural language queries to the LLM to analyze device state. For instance, a security expert monitoring a computing device and detecting unexpectedly slow execution of a workload may submit English-language queries such as:

"Why is my database executing slower than usual?",

"I think there is something problematic in my system, please look at every process to determine what encryption is being executed and what seeds are being used, and retrieve any encryption keys", "My network is running slower than usual—I have three computers executing a database and I am worried that there is a threat actor running on my system, please determine if anyone is running encryption and get the keys in case I need to decrypt", "Please check that my backups are accessible and have not been encrypted".

In response, the LLM can generate program code and/or scripts that can be executed on the system to analyze system status. Note that such sessions are typically iterative, with the user then asking often asking subsequent, more-detailed clarifying questions based on the LLM's responses and the data generated by the executed LLM program code. LLMs are good at following instructions and are trained using online data that spans all known file formats and programming methodologies, and hence can readily detect and analyze a wide range of scenarios. Query responses typically include a list of sources that can be checked to confirm that the results are accurate.

Encryption-related natural language queries that were previously submitted to an LLM embedded on a computing device can be a valuable resource that can later be reused to automatically evaluate and diagnose a system experiencing issues that share similarities with previously-encountered scenarios. Hence, in some embodiments, an LLM agent operates in conjunction with the LLM to track every natural language query, LLM responses, and the corresponding execution state and workload of the computing device both at the time of the query and after executing any program code returned by the LLM. Tracking such information allows the LLM agent to gather a set of "best-practice" encryption-detection techniques that can later be leveraged to automatically detect and analyze situations to determine similarities to those previously encountered and potentially take action. The ability to re-apply relevant queries, in combination with the ability of the LLM to adaptively adjust output code to different conditions and parameters, facilitates detecting a wider range of encryption attacks than previous pre-programmed/hard-coded encryption monitoring systems. The disclosed techniques leverage the general capabilities of the LLM and the previous queries of human experts to create a specialized, adaptive LLM agent with focused encryption-detection capabilities that can protect against ransomware more effectively than previous approaches.

Figure 6A:
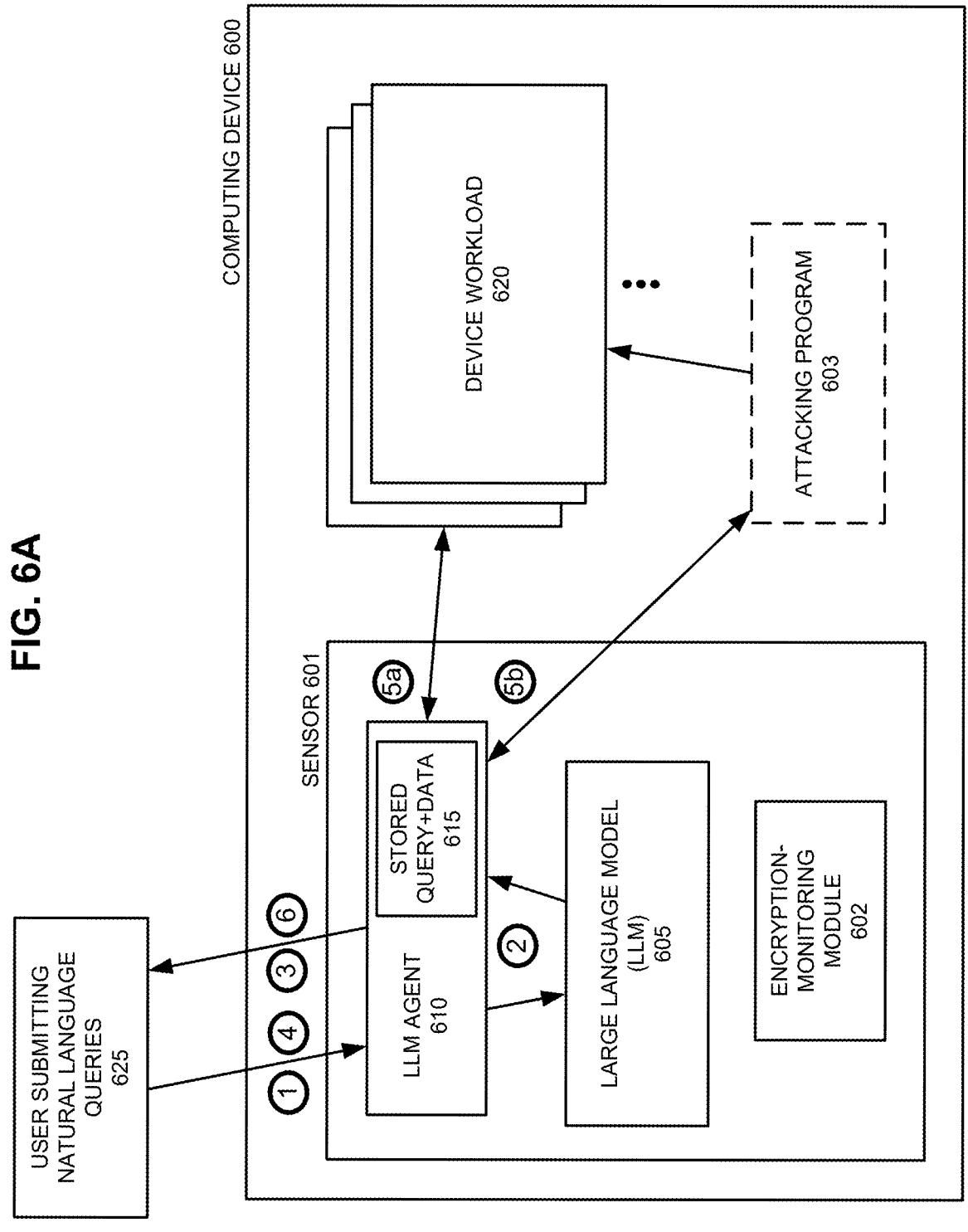
FIG. 6A illustrates an exemplary scenario in which a user submits a query to a sensor in accordance with an embodiment.
Figure 6B:
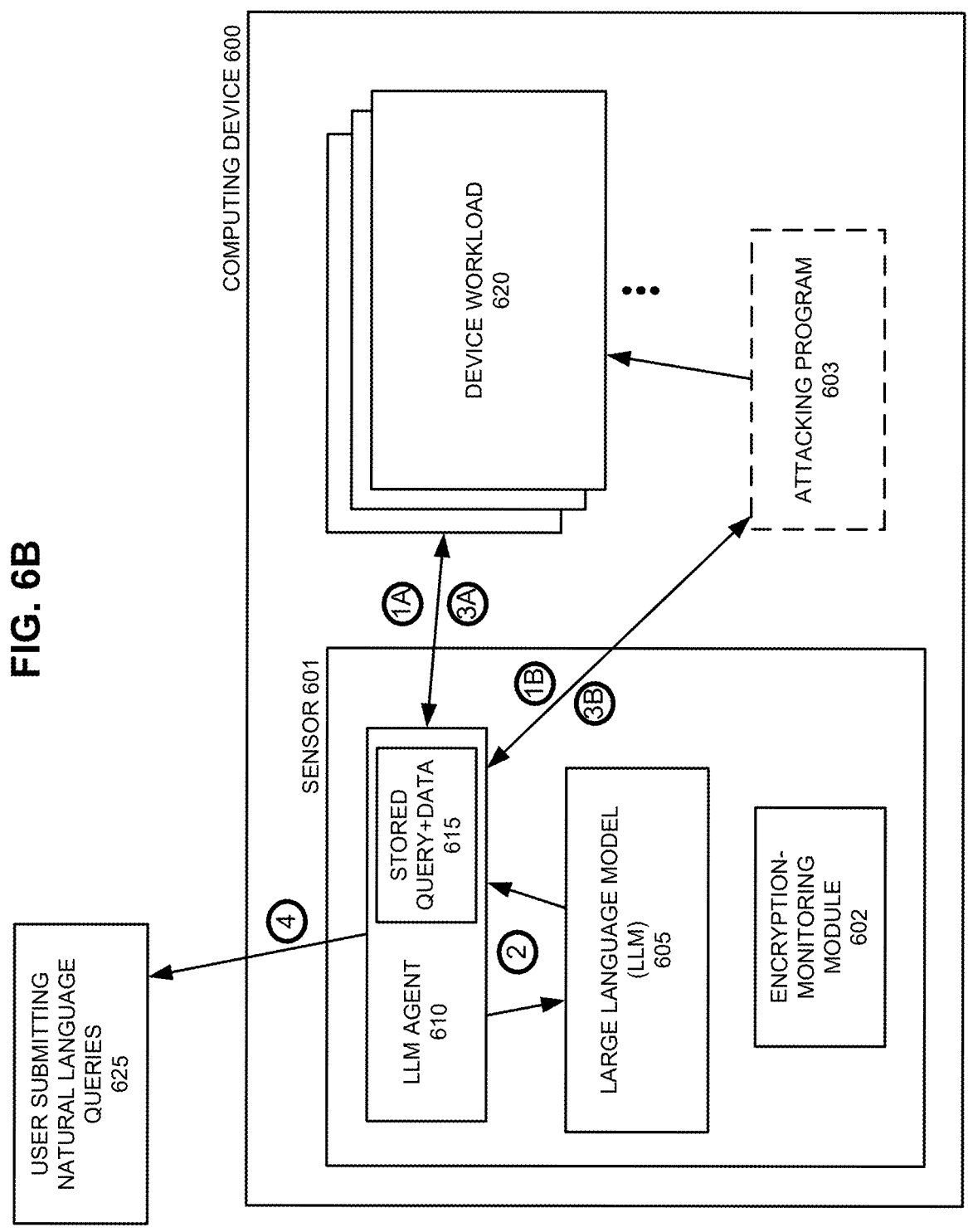
FIG. 6B illustrates an exemplary scenario in which an LLM agent leverages previously-stored queries and data in accordance with an embodiment.

FIGS. 6A-6B illustrate an exemplary scenario in which computing device 600 includes a sensor 601 that executes a large-language model (LLM) 605 that responds to natural language queries. Sensor 601 also includes an LLM agent 610 that tracks the queries received by LLM as well as data associated with those queries 605. For instance, LLM agent 610 may: (1) intercept, monitor, and/or store the queries received from a user 625; (2) determine (and record) the execution state of one or more device workloads 620 and a potentially attacking program 603 executing on computing device 100; (3) execute program code generated by the LLM 605 in response to a query; and (4) resubmit stored queries to LLM 605 to get modified program code that reflects changes to the execution state of device workloads 620.

Note that sensor 601 may also still include all of the earlier functionality include in the previously-described encryption-monitoring module 602.

FIG. 6A illustrates an exemplary scenario in which the user 625 submits a query to sensor 601 enquiring about a potential issue on computing device 600 (operation 1). LLM agent 610 receives the query and forwards it to LLM 605, which executes and returns a response to LLM agent 610 (operation 2), which in turn sends the response back to user 625 (operation 3). In this scenario, the response includes program code that can be executed to analyze the execution state of device workload 620 and/or a potentially attacking program 603. User 625 instructs sensor 601 to execute this code (operation 4), which LLM agent 610 proceeds to initiate (operations 5A-5B), after which the user is updated with the results (operation 6). Throughout this process, LLM agent stores data associated with the query and execution states in stored query+data 615. Note that this process may iterate many times (not shown) with a wide range of different and/or increasingly detailed queries as user 625 probes the operating state of computing device 600 to determine if there are any issues, with LLM agent 610 recording the queries along with their outcomes and corresponding computing device and/or workload state.

FIG. 6B illustrates an exemplary scenario in which LLM agent 610 leverages previously-stored queries and data 615 at some subsequent point in time. For instance, sensor 601 and/or LLM agent 610 may be configured to periodically check the state of workloads executing on computing device 600 (e.g., device workload 620 and attacking program 603, as shown for Operations 1A-1B). Upon comparing and detecting a state previously identified as anomalous in some previous query interactions, LLM agent 610 re-submits a query that was submitted previously for a substantially similar state as the current state to the LLM 605 along with a representation of the current state of the system (operation 2), and receives from LLM 605 a response that matches that current state. More specifically, because LLM 605 can automatically recognize and adapt to differences between the previous and current state, it can generate a response that is adapted to and relevant for that current state, even if the original stored query did not exactly match the current state. LLM agent 610 can then, for instance, execute the most recent program code generated by LLM 605 to further analyze or affect the current system operation (Operations 3A-3B), and may iterate Operations 1-3 with additional queries based on the results (not shown). If the results indicate potential issues, LLM agent 610 can flag an alert to a user (e.g., user 625, as shown by Operation 4).

In some embodiments, an LLM agent is trained using an existing set of encryption detection, analysis, and decryption techniques to create an encryption edge agent (EEA) that can subsequently detect computing device state and submit queries to flag and/or resolve encryption attacks automatically. The ability to repeat previous queries that are adapted (by an LLM) to scenarios that are similar but have differences enables a higher level of protection than previous techniques while using less compute resources and direct human effort.

In some embodiments, the set of previously-described characteristics of encryption attacks are incorporated into a set of scenarios and queries that are stored by an EEA for future re-use. For example, a human security expert may craft (or otherwise encounter) a set of scenarios in which queries are applied that train the EEA to detect and analyze encryption-related operations based on:

accesses to known encryption libraries/function calls;

accesses to known random number generators;

detection of generation of encryption seeds via other mechanisms;

detection of anomalous encryption sources via comparison with typical encryption operations (e.g., normal encrypted communication via TLS and normal encrypted filesystem/SMB operations)

detection of heavy XOR instruction use in program code that is indicative of encryption operations;

detection of an unknown encryption standard via comparison to standard encryption program code (e.g., AES, Chacha, etc);

detection of encryption by programs that have not been signed by an authorized application vendor to indicate that the software vendor has been verified and the program code has been checked;

detection of bignum instructions in program code that are indicative of asymmetric encryption (and not associated with other known sources);

detection of meta-signatures associated with known ransomware executables; and detection of files and/or data streams with high entropy and no low entropy segments.

By monitoring and storing such queries (and the associated system state and outcome), the EEA can effectively mimic the encryption expertise and decision diagrams of a human encryption expert. In some embodiments, the human expert may also tag and/or annotate the results/outcome of a set of iterated queries to more clearly identify and differentiate the scenario that was encountered, thereby allowing similar outcomes to be associated with each other by the EEA. For instance, the user may identify part of a query or observed conditions for future re-use or to provide more information to the EEA to indicate a set of queries that are generally applicable or categorize situations in which it might be most appropriate to run a given query. Some of the following paragraphs describe in more detail how a set of queries can explore some of the above scenarios, and how an EEA and an LLM working together can overcome variation in subsequent scenarios.

One exemplary scenario involves leveraging queries to an LLM to overcome ransomware containing obfuscated encryption program instructions in its executable instead of using system calls and linking to encryption libraries. A set of natural language queries that explore a suspicious executable might progress as: (1) "does this executable look similar to known ransomware?", followed by a request for further analysis—(2) "what language was this executable written in?", followed in turn by (3) "find AES and Chacha encryption code written in that language and tell me if this executable has similar structure." An LLM can look up assembly instructions for known encryption techniques in known programming languages and then compare the assembly code with the instructions that are being executed to determine if the executable is performing similar encryption. Such queries can leverage the ability of the LLM to identify unusual programming languages (e.g., PASCAL) that may result in unusual ransomware executable formats that might otherwise not be immediately apparent.

Another exemplary scenario involves leveraging queries to an LLM to deterministically decide whether data on a computing device is being encrypted. More specifically, queries to an LLM can be used to determine if a set of data contains purely "high entropy" characteristics (e.g., has high variance with no recognizably readable data and/or patterns) or contains at least some low entropy fields. Encrypted data typically has no recognizable patterns nor identifying fields, unlike non-encrypted data. For instance, compressed data, video data and other legitimate data may include predominantly high entropy data, but generally include some low entropy sections that identify the file format (e.g., in a file header) or some other information. Hence, upon identifying an executable that is executing suspicious operations of interest to the monitoring system (e.g., a large number of XOR instructions or calls to encryption libraries), a set of readily re-usable, representative queries may start with a query of "is the target application generating high-entropy data?" In response, the LLM may generate program code that analyzes the data being operated upon by the suspicious executable. If this code determines that (based on low-entropy data being present) this is standard data compression or video data, the executable is determined to be harmless, and no longer needs to be monitored for encryption keys (e.g., thereby saving compute resources and allowing such resources to be focused on actual threats). If the data comprises purely high-entropy data, a follow-on query may specify "replicate the program code, apply it to this given input, and give me the output"-if the output has high entropy and no low-entropy sections, the program code is likely to be malicious encryption and can be flagged. Note that this exemplary scenario illustrates a situation where the same queries submitted to the LLM may result in very different follow-on queries and results based on the data patterns submitted to the LLM. The LLM can generate program code based on the data it analyzes, and can be automatically updated over time to detect new file types and patterns for valid file formats, including data formats that did not exist at the time of the original tracked queries.

A third exemplary scenario similar to the preceding high-entropy detection example involves checking whether backups are still accessible and unencrypted, since backups are often a primary target of ransomware. Related queries might include "is my backup software running?" and "are my backups accessible." An LLM can generate program code that inspects the set of executing processes and filesystem to determine the backup system that is used, and then use a subsequent query that determines how to generate code that tests whether the backups created by that backup system are accessible and not encrypted.

As mentioned earlier, the ability of an LLM to adapt over time provides a substantial benefit for ransomware detection using tracked queries. The underlying LLM implementation can be updated transparently over time as underlying training data changes and new models are formulated, with subsequent resubmissions of tracked queries benefitting from the updated LLM contents and associations. Consider a set of tracked queries such as: (1) "compare the five most common ransomware prevalent today and generate code that can detect them;" (2) "identify the file format for this target file;" or (3) "check if my database entries are not high-entropy." The set of most common ransomware will change over time, but an updated LLM will continue to provide relevant analysis based on the most recent ransomware developments. Similarly, updates to the LLM will keep it current for existing and new file formats and database access methods, allowing the LLM to be interoperable with everything. Hence, a set of tracked natural language queries will continue to generate results that can adapt to handle a wide range of evolving situations and technologies without further human training or intervention. Note that this ability to automatically improve a response to a given query over time as trends and technology evolve provides substantial benefits when contrasted with hard-coded techniques that require an engineer to determine the underlying changes and modify a program manually to handle any such changes.

In some embodiments, a number of sources may trigger an EEA to execute a set of tracked queries. In one scenario, a human user may detect strange system behavior and send a direct request to the EEA to initiate a range of queries that were tagged as ransomware-detecting queries. Alternatively, a system and/or an encryption monitoring mechanism may detect characteristics that trigger further evaluation, such as an unusual number of XOR or bignum instructions, the detection of unusual random number generator usage, unusual system load, or a file with high entropy. A wide range of detected situations (as described in the examples above) can lead to the invocation of tracked queries that were related to previous scenarios with similar symptoms and the detection of attacks. Furthermore, the identification of issues that are not attacks can substantially reduce monitoring overhead by determining processes and situations that do not need further monitoring, hence freeing resources and attention for actual issues. For instance, in some embodiments, an EEA may disable an encryption monitoring system for certain processes that are detected to be legitimate (e.g., disabling key harvesting for standard TLS network encryption and encrypted filesystem processes).

Note that the disclosed query-tracking and -execution techniques are more proactive than some existing and previously-described monitoring techniques. Some instances of encryption monitoring systems may passively detect encryption operations and gather all detected keys to enable later decryption; such techniques are still of great value for some recovery operations. However, in contrast, the disclosed query-tracking techniques facilitate detecting issues more proactively, and potentially flagging encryption attacks during operation or prior to execution. The two sets of techniques can operate together to provide an overall higher level of protection. In some embodiments, the disclosed techniques may be configured to alert a human administrator upon detected a suspected encryption attack. In some embodiments, the disclosed techniques may even be configured to freeze and/or stop such processes to ensure that they can be evaluated for safety before proceeding. Note also that the disclosed LLM and edge agent techniques can also be used to gather queries and techniques for performing decryption of ransomware-encrypted data.

Queries submitted to an LLM may generate erroneous results ("hallucinations") and/or program code. While the preceding description and examples generally describe positive outcomes and detections, sometimes an LLM output may be incorrect. LLM outputs typically include references to the sources used in their outputs, allowing human users to check the output for correctness. In some embodiments, an EEA may be configured to also track queries that are determined to have returned incorrect results, and track how a user resolves such situations so that subsequent automated queries by the EEA can also be checked for correctness. For instance, a user may submit one or more queries and/or results to a second, independent LLM to see if the results are correct. Similarly, and EEA may be configured to interact with and submit queries to multiple LLMs and compare the results to determine correctness. If the results differ for a given query, one technique involves re-submitting the query to the LLMs and indicating that the previous answer was insufficient; often, such resubmissions can result in modified results that are more accurate.

In some embodiments, the disclosed query-tracking and resubmission techniques may be applied in a single computing device (as illustrated in FIG. 6A), in a hypervisor for a system executing multiple virtual machine (such as the computing environment 250 in FIG. 2B), or in a computing environment with multiple communicating computing devices. For instance, LLM queries may be tracked and/or gathered across multiple devices to create a shared compilation of techniques that can be accessed and executed. Furthermore, participating devices may be configured to submit metrics on which queries are re-executed most frequently and which successfully detect problems. Such metrics can then be used to prioritize the re-execution of queries that are most likely to detect ransomware or other threats successfully.

Figure 7:
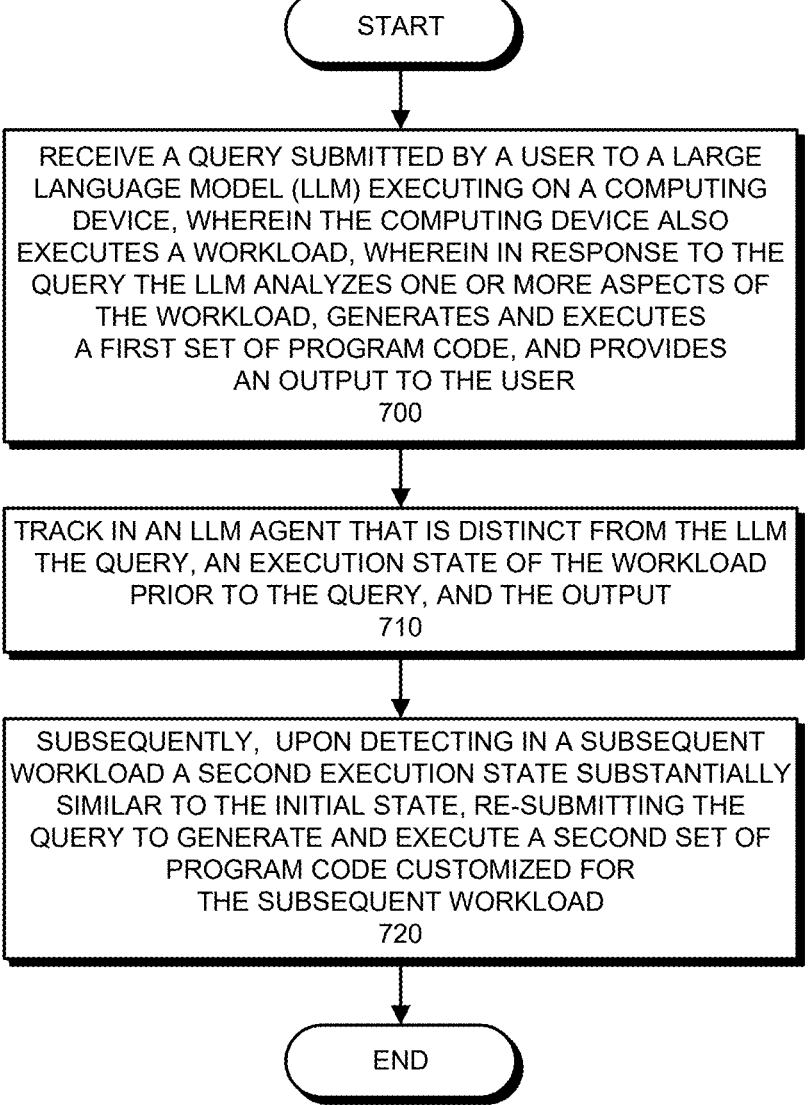
FIG. 7 presents a flow chart that illustrates the process of performing automated detection of encryption using computational intelligence in accordance with an embodiment.

FIG. 7 presents a flow chart that illustrates the process of performing automated detection of encryption using computational intelligence. During operation, a computing device receives from a user a query submitted for a large language model (LLM) executing on a computing device. The computing device also concurrently executes a workload, and in response to the query the LLM analyzes one or more aspects of the workload, generates and executes a first set of program code, and provides an output to the user (operation 700). An LLM agent associated with but distinct from the LLM tracks the query along with the output and the execution state of the workload prior to the query (operation 710). Subsequently, upon detecting in a subsequent workload (on this computing device or potentially on another computing device) an execution state substantially similar to the earlier execution state of the first workload, that same query can be re-submitted to an LLM in the context of the subsequent workload to generate and execute a second set of program code that is customized for the subsequent workload (operation 720).

In summary, advances in the development of machine-learning technology and the formulation of compact LLM models that can be easily stored and executed on devices can be leveraged to improve the detection of ransomware and encryption attacks. An encryption edge agent tracks a query submitted by an encryption expert to an LLM, the execution state of a workload, program code output by the LLM in response to the query, and the effects of executing the program code. Subsequently, upon detecting a similar (but distinct) scenario, the EEA re-submits the same query to the LLM to generate a customized solution to the new scenario. Hence, the EEA leverages tracked human expertise and the LLM to improve the detection of unauthorized encryption operations and ransomware.

Ransomware Attacks Against Large Data Volumes

In some ransomware scenarios data sizes may prevent an attacker from conveniently encrypting an entire piece of data. For instance, a data volume may be so large that there is insufficient space to efficiently create an encrypted copy. In such situations, an attacker may instead choose to encrypt only selected portions of a large data volume. For example, an attacker may attempt to corrupt and render such a data volume unusable by encrypting the beginning of the data volume and then skipping through the data volume encrypting additional portions of the file.

Consider, for example, Virtual Machine Disk (VMDK) images, commonly used in VMWare environments, which are used to store entire file systems for virtual machines. VMDKs are often used in large multiprocessor systems that concurrently run a large number of Windows and/or Linux servers that share one or more VMDKs for storage purposes. For instance, VMDKs may be used to store or copy server templates, virtual machine images, and shared backups. Unfortunately, ransomware attacks often target these VMDKs, encrypting the data within and rendering it inaccessible. In some cases, multiple instances of ransomware may attack the same VMDK via separate processors that are concurrently mounting that VMDK, which can lead to double-encryption or corrupted encryption state. Traditional recovery methods often fail when both encryption and corruption are involved, especially on Linux EXT4 and Windows NT file systems, which have different structural characteristics. The need for an intelligent, automated reconstruction process is critical to restore such virtual machines.

Figure 8A:
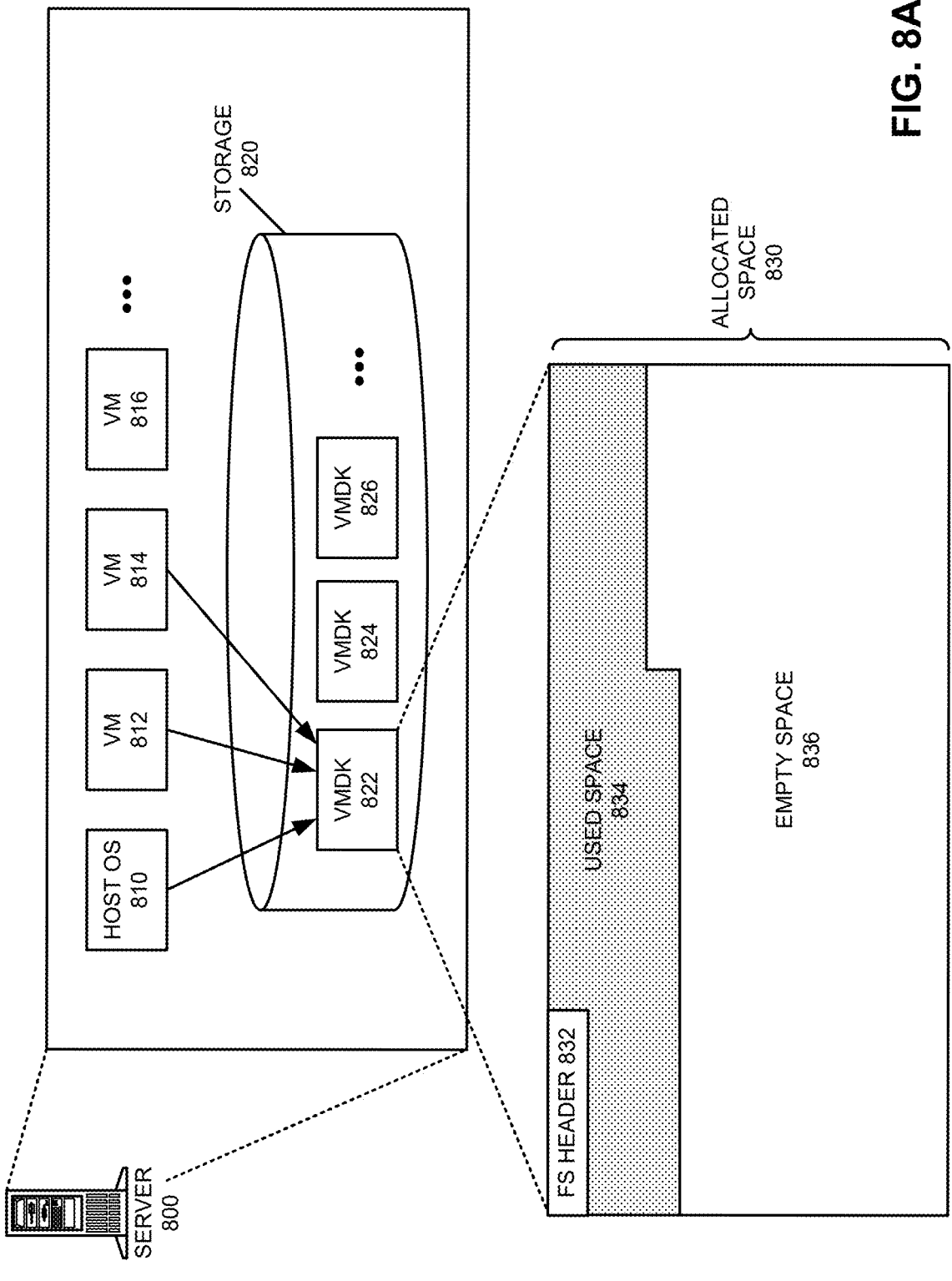
FIG. 8A illustrates an exemplary scenario in which a server hosts a number of virtual machine disk images in accordance with an embodiment.

FIG. 8A illustrates an exemplary scenario in which a server 800 with storage 820 hosts a number of VMDKs (822-826). A host operating system (OS) 810 on server 800 may execute a number of virtual machines (VMs 812-816). In the illustrated example, host OS 810, VM 812, and VM 814 all share access to VMDK 822. VMDKs may range in size from 5 GB to the order of terabytes or potentially much larger. While it is possible to allocate storage to a VMDK on demand, more typically a VMDK is allocated a large amount of space at the time that it is created, both to ensure that it does not run into space constraints later when space is no longer available and/or to claim a contiguous block for performance purposes (depending on the storage media). In FIG. 8A, exemplary VMDK 822 has been allocated a space 830 to store a filesystem that includes a filesystem header 832 (illustrated at the beginning of the space), a set of used space 834 currently storing filesystem data, and an empty space 836. Note that empty space 836 in a VMDK is typically allocated as all zeros (e.g., zeroed out prior to first access by host OS 810).

Figure 8B:
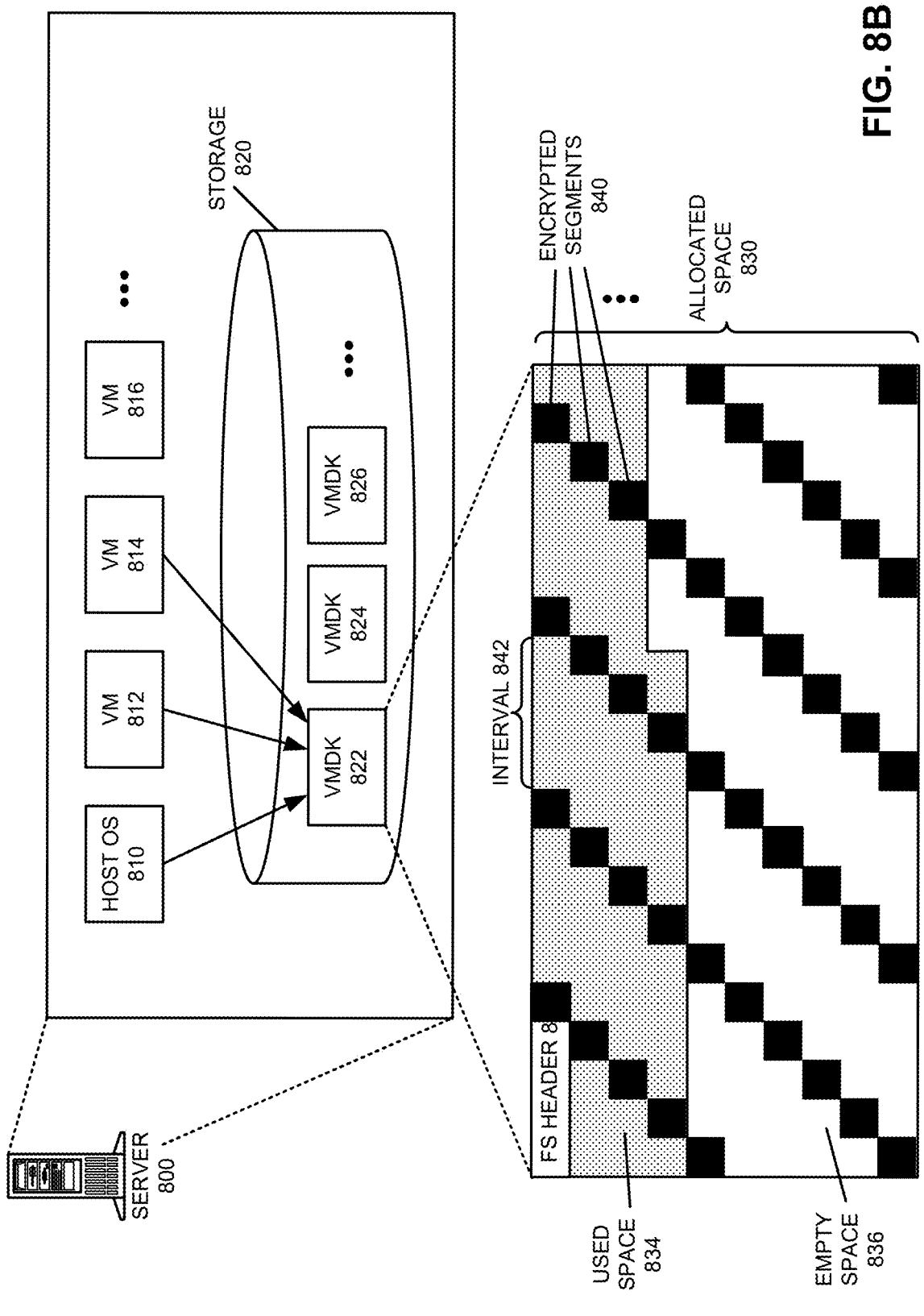
FIG. 8B illustrates an exemplary scenario in the server illustrated in FIG. 8A has been the target of an encryption attack in accordance with an embodiment.

FIG. 8B illustrates the exemplary scenario of FIG. 8A following an encryption attack in which one or more threat actors (not shown) break into server 800 and encrypt VMDKs. As described above, VMDK 822 is sufficiently large that a ransomware attacker cannot just copy and encrypt the entire data storage area in one operation, and instead selectively encrypts portions of the data space. Because the VMDK is so large, the attacker may choose to encrypt intervals of the volume starting from the bottom, in an attempt to encrypt as much data as possible without being detected and without applications and/or operating systems using the VMDK crashing before the encryption completes. The dark encrypted segments 840 illustrated in FIG. 8B begin at the end of allocated space 830 and progress through empty space 836, used space 834, and FS header 832. Note that while encrypted segments 840 are illustrated with a regular size and interval 842, this is not always the case and may vary by ransomware. For instance, while in some instances such characteristics may be fixed (e.g., 128 KB encrypted blocks with 2 MB intervals, or 4 KB encrypted blocks with 10 KB intervals, etc.), they may instead follow some variable size and interval. However, the fact that the ransomware writer does depend on the process being easily reversible after a ransom is paid provides a motivation to keep the parameters simple if possible. Often ransomware will be configured to write an encrypted header at some segment of the target that tracks the pattern and sizes used, so that this information can be recovered (using the decryptor) after the ransom has been paid, just in case the information was otherwise lost. However, this failsafe depends on ransomware author being diligent and the header being written successfully, which can sometimes fail if the attack goes wrong. Furthermore, this information may not be easily deciphered by the victim, and would only be available after a decryptor has been purchased or otherwise found.

Note that the attacker is not illustrated in FIG. 8B—it may not be immediately apparent where the attack is originating from. The attack could originate from any of the hosts mounting VMDK 822 (e.g., host OS 810, VM 812, or VM 814). Furthermore, it is possible that a ransomware may have infected multiple devices, and that there may have been multiple encryption attacks upon VMDK 822 that either occurred simultaneously (in a close timeframe) or serially; unless the attacks are actually observed, it may be challenging to determine whether two instances of the same attack encrypted the same data segments using the same intervals, if there were two different attacks that had different sizes and intervals, or if there was one attack that used varying sizes and intervals.

In some embodiments, recovering from a ransomware attack involves analyzing a partially-decrypted file to determine any encryption patterns that are present. For large, sparsely-populated data storage areas (e.g., comprising mostly zeros), this can involve detecting non-zero patterns in portions that would otherwise be expected to be all zeros (e.g., unencrypted blank space). For instance, analysis may determine that the empty space in a VMDK comprises a recurring pattern of zeros followed by a small amount of non-zero data, and then zeros again, alternating. If such patterns occur with regularity, they are likely to indicate an encryption pattern. Hence, one encryption-pattern-detection technique may involve searching for a portion of a data storage area that includes a large number of zeros, determining the longest continuous stretch of zeros, and then determining if there is a recurring pattern that follows the length of that zeroed stretch. For coding simplicity and compactness, encryption writes are likely to follow some standard and regularly-patterned boundaries (e.g., kilobyte-aligned encryption-block- and interval-aligned boundaries such as 1 KB, 2 KB, 10 KB, etc.).

Note that while the preceding examples refer to VMDKs, the disclosed techniques can be applied to any large data storage units that may not be easily encrypted in a single operation and/or for any other reason are encrypted in associated separated subsections in some manner. The general term "data storage" hence may be applied (but not limited) to a wide range of large data storage options that include hard drives, SSDs, very large files, blob storage, disk images, VMDKs, partitions, etc.

Over time, as the disclosed detection and decryption techniques become more widely known in the security community ransomware writers may add variation and complexity to make recovery more difficult. In some embodiments, computer intelligence are leveraged to scan for, detect, and recognize encryption patterns in large, partially-encrypted data storage areas. For instance, tracked queries submitted to an LLM (as described in previous sections) can be used to: analyze such data storage areas to determine if they have been partially encrypted; determine if patterns found match existing known patterns and/or precedents; determine if encountered patterns match for a combination of multiple previously-encountered patterns, and; attempt to determine the existence of new patterns that have not been seen previously in multiple encrypted subsections.

Identifying the pattern for sections of associated encrypted data facilitates decrypting the combined encrypted sections in a manner substantially similar to the file decryption techniques disclosed in the preceding sections. For instance, the above-disclosed techniques that leverage computational intelligence techniques to identify the encryption technique that was used and generate a decryptor can be applied to the combined split encrypted data once the pattern has been determined. Similarly, queries to LLMs and other machine learning models can be leveraged to automate and speed-up decryption of ransomed data.

However, having more machines that may be possible attack platforms expands the number of harvested keys that need to be evaluated, and the possibility of multiple rounds of encryption potentially arising from multiple infections may also require a large number of key combinations to be evaluated and/or tested, which can dramatically increase the complexity of decryption and recovery. In some embodiments, additional analysis and evaluation techniques are used to narrow the set of keys that need to be tested during recovery.

Note that computational intelligence can span a range of machine-learning techniques that include artificial-intelligence techniques, generative pre-trained transformers, large-language models, etc. Note also that techniques that can leverage machine-learning locally (e.g., leveraging a local LLM instead of other public cloud-based mechanisms that are detectable by the public or other vendors) may be particularly appealing to keep knowledge of a ransomware attack private; publicity associated with such attacks can have very negative impacts on an organization's value and/or business prospects.

In some embodiments, known characteristics of an encrypted target data storage area are used to facilitate more efficient identification of the correct decryption key(s). For instance, both the Linux EXT4 and Windows NT file systems include a block of filesystem data in a header that has a known format and some known identifying contents. Encryption keys and decryptors can be tested against such known contents to determine whether a given key (or set of keys) match what is needed for recovery-if the known contents are found after a test decryption, the correct keys have been found. For example, FIG. 8B illustrates that a portion of FS header 832 has been encrypted; if a key being tested for decryption matches header and filesystem characteristics, then the key identification has been successful.

As described above, part of the difficulty in identifying the right key(s) arises because there are multiple processing units that may have been the source of an attack. Hence, any ability to narrow down the set of potentially culpable attack sources can significantly reduce the recovery effort. Unfortunately, attackers who have managed to break into a target typically remain resident for a considerable amount of time (e.g., multiple days to a year or more) manually monitoring the attack and ensuring that the attack isn't discovered prematurely. Furthermore, attackers are typically also very careful in covering their tracks to ensure that a target device's vulnerabilities and/or any traces of the means of entry into the target device(s) (and any incriminating information about any accomplices in the targeted organization) are not later recoverable, thereby also ensuring that vulnerabilities do not become public and get patched.

In some embodiments, computational intelligence can be applied to apply heuristics that can narrow down the set of keys that need to be considered. Brute force evaluation of a large set of keys can be very expensive (e.g., performing a large number of random test decryptions), and being able to leverage the set of techniques used by experts in previous recovery attempts can change the potential solution from brute force to a more intelligent, targeted approach that substantially reduces the amount of computing effort required. For instance, stored queries applied to an LLM can be used to track and evaluate both (1) mount records that map VMDK images to processors, and (2) directory information (e.g., the output of 'ls' and 'dir' commands in Linux and Windows, respectively) to determine when data volumes were accessed. Such queries may be used to identify the time of attacks, and potentially eliminate some processing units (and their associated collected encryption keys) that did not mount an affected data volume or perform accesses in the attack timeframe from consideration, thereby reducing the number of decryption tests that need to be performed. Note that such information may also indicate an order of attacks if multiple attacks occurred and the attacking encryption techniques are order-dependent, potentially further reducing the size of the set of keys that need to be tested. Computation intelligence techniques can apply and analyze the output of known heuristics and find encryption and decryption patterns much more quickly than humans, thereby achieving successful recoveries that would otherwise not be possible in a reasonable timeframe.

In some embodiments, initial decryption efforts focus on evaluating the set of individual candidate keys. In principle, most attackers would prefer not to doubly encrypt a set of data, because it offers no additional ransoming benefit and only complicates (or potentially eliminates) the ability to recover the ransomed data after a ransom is paid, which can reduce the reputation and profits of the ransomware creator. Furthermore, the number of test decrypts for individual keys scales with the number of keys (O (n)), which is computationally much less expensive than the number of test decrypts involving combinations of multiple keys. The test for these individual keys can be optimized using computational intelligence to reduce the number of decryption techniques and variations that need to be explored as described in earlier sections. Note also that such tests are independent and hence highly parallelizable; given sufficient computing resources, many tests can be performed simultaneously to explore the decryption space more quickly.

In some embodiments, if the set of keys have been explored individually and no decryption match has been found, then the recovery system proceeds to test combinations of keys. As mentioned above, any gathered device information that can be used to determine attack sources, timing, and order can help narrow the testing needed and reduce testing computation. Two attacks that are close in time are likely to be the same ransomware accidentally being invoked twice, and hence are likely to use the same encryption technique. In some embodiments, an initial assumption (which can be strengthened using computational intelligence techniques that narrow down encryption characteristics) focuses initial tests on the most common and popular encryption techniques, Chacha and AES-GCM, first. These techniques are both XOR based, which mean that the order in which sets of keys that are being evaluated is not important—e.g., they can simply be XOR'd together. Eliminating order as a factor substantially reduces testing computation. In general, even if only a small, known portion of data (such as the FS header) is being test-decrypted, there are likely to be many permutations to explore; successfully finding a set of key combinations will depend heavily on the success of computational-intelligence-based techniques that can reduce the problem space.

In some scenarios, a monitoring attacker may realize that two ransomware copies are accidentally, simultaneously executing on the same storage data from two different processing units, and manually halt one before it completes. This can result in some encrypted subsections having a different number of encryption keys than other sections. In some embodiments, if an initial set of keys that has been found to work for decryption suddenly stops working, the system will automatically try subsets of that initial set for the remainder to determine if the described scenario has occurred and subsets of the keys can still decrypt the remaining data. Such scenarios may also be associated with changes to the encryption pattern, which may be detected by the above-described pattern detection efforts.

Note also that in some situations race conditions between two simultaneous attacks may result in some subsections being encrypted by one key before the other, and then vice versa. If the encryption techniques are XOR based they may not be an issue, but if multiple writers are simultaneously writing the same data blocks (e.g., if no write locking is available), this may result in alternating singly-encrypted subsections or write collisions that result in completely corrupted subsections. Such conditions can be detected and diagnosed as long as some known data can be decrypted to confirm a working set of keys.

Figure 9:
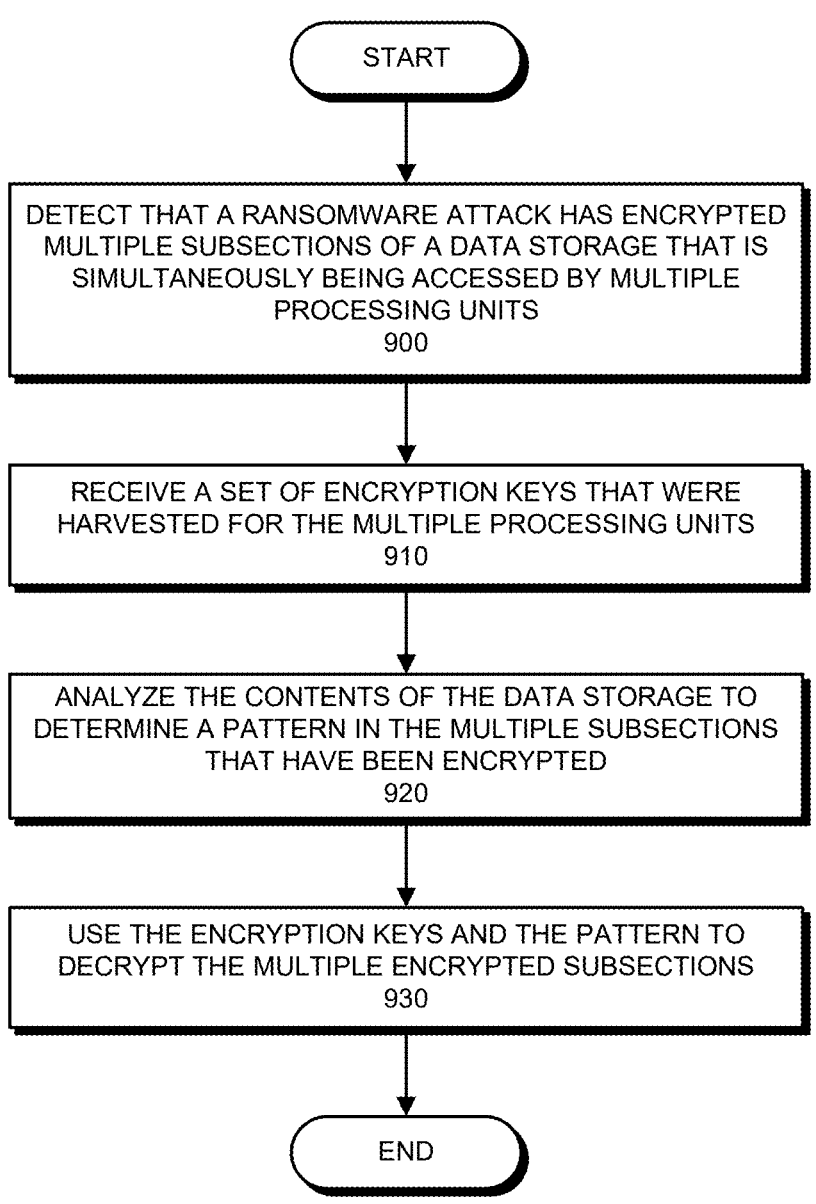
FIG. 9 presents a flow chart that illustrates the process of recovering from a ransomware attack using computational intelligence in accordance with an embodiment.

FIG. 9 illustrates the process of recovering from a ransomware attack using computational intelligence. During operation, a monitoring system detects that a ransomware attack has encrypted multiple subsections of a data storage that is simultaneously being accessed by multiple processing units (operation 900), and receives a set of encryption keys that were harvested for the multiple processing units (operation 910). The system analyzes the contents of the data storage to determine a pattern in the multiple subsections that have been encrypted (operation 920), and then uses the encryption keys and the pattern to decrypt the multiple encrypted subsections (operation 930).

In summary, ransomware attacks against large data volumes may encrypt only a set of subsections of a given data volume. Detecting and recovering from such attacks involves some additional complexity in detecting such encryption patterns and may further require recovery techniques that involve multiple keys. Recovery techniques can leverage computational intelligence to detect encryption patterns and then explore the harvested key space to recover encrypted data in such scenarios.

Computing Environment

Figure 4:
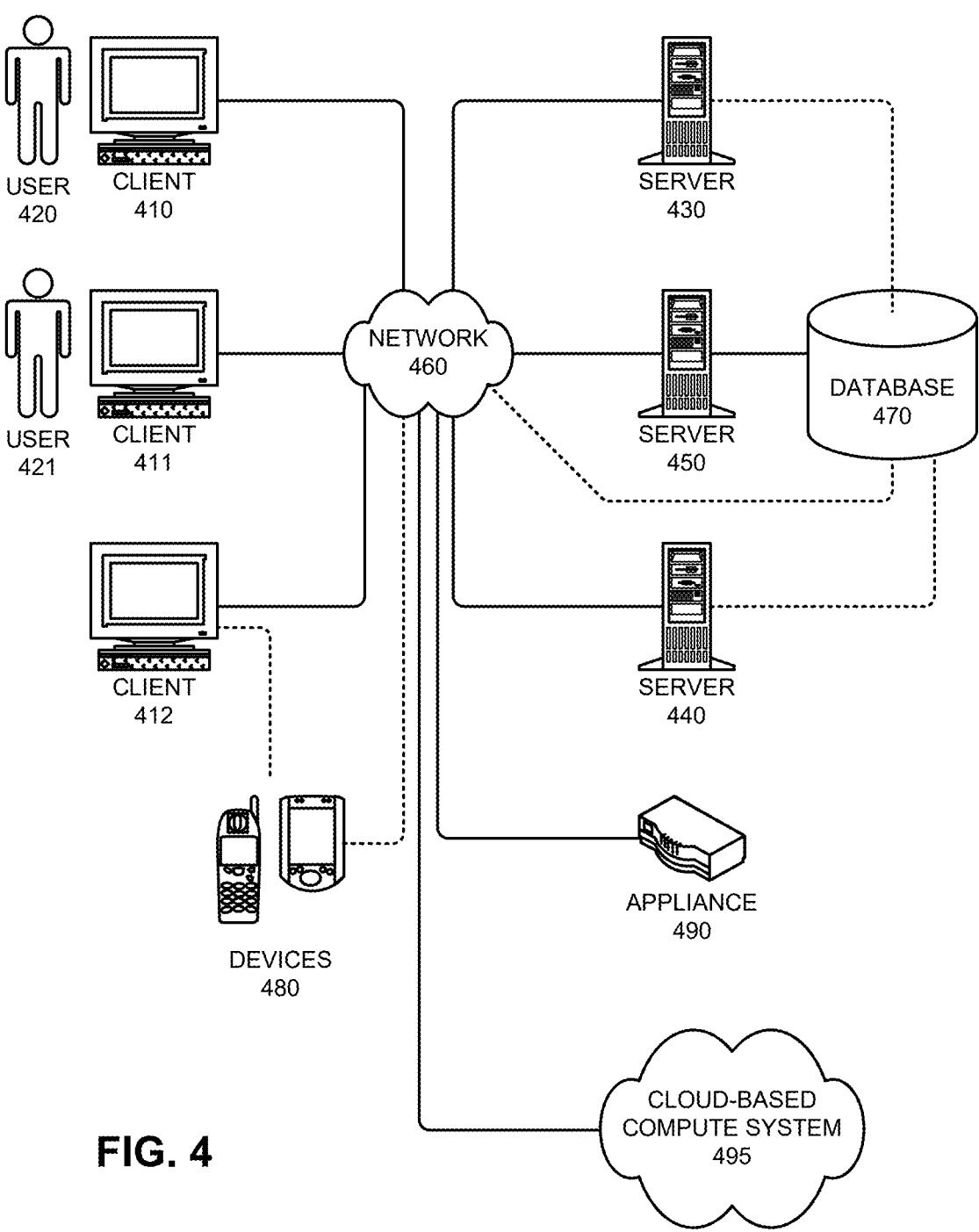
FIG. 4 illustrates a computing environment in accordance with an embodiment.

In summary, embodiments of the present invention facilitate enhancing ransomware detection accuracy and recovery using computational intelligence. In some embodiments of the present invention, techniques for executing an LLM, tracking queries to an LLM, monitoring encryption operations, extracting encryption keys, recovering encrypted data, detecting ransomware false positives, and stopping suspected ransomware executables can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450. Servers may execute a large number of micro-services and/or virtual machines.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based compute system 495 can include any type of networked computing devices (e.g., a federation of homogeneous or heterogeneous storage devices) that together provide computing and data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
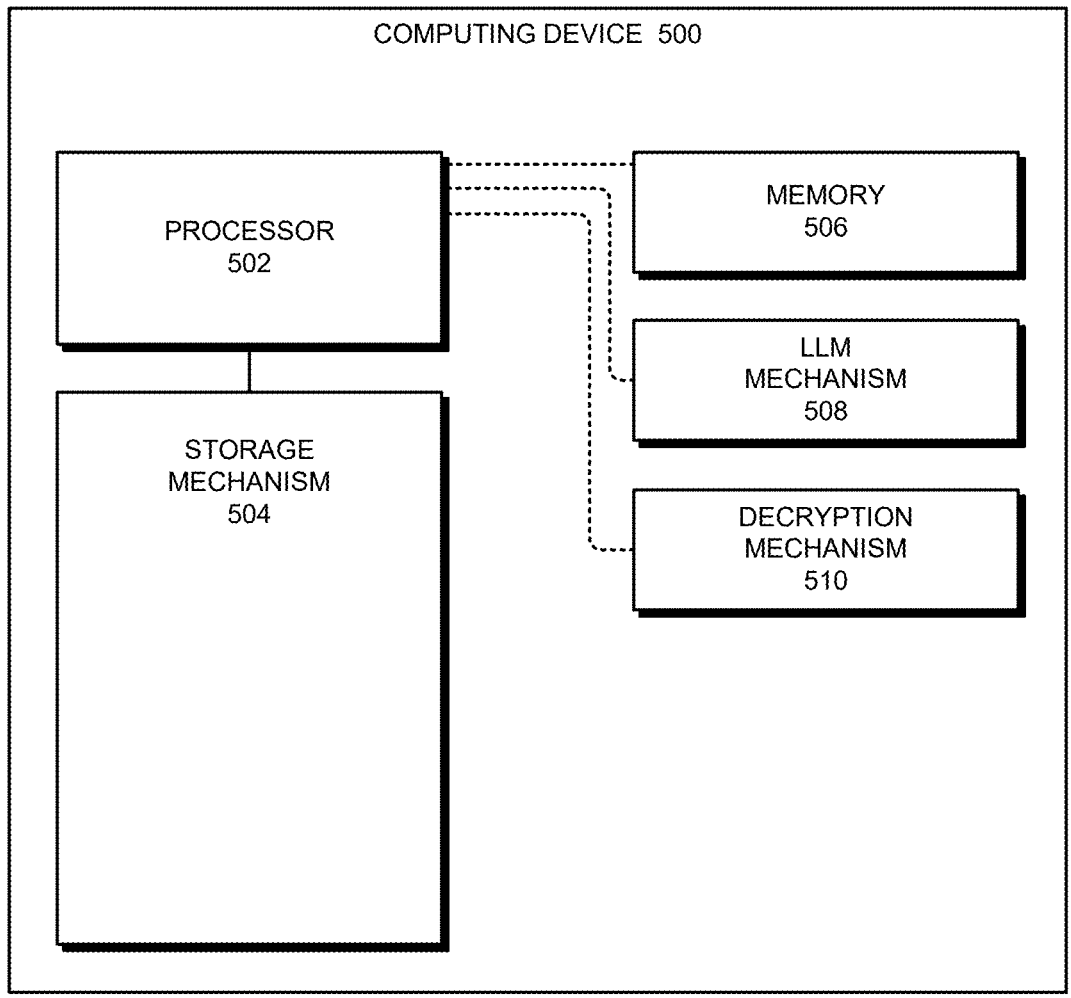
FIG. 5 illustrates a computing device in accordance with an embodiment.

FIG. 5 illustrates a computing device 500 that includes a processor 502 and a storage mechanism 504. Computing device 500 also includes a memory 506, an LLM mechanism 508, and a decryption mechanism 510.

In some embodiments, computing device 500 uses processor 502, memory 506, LLM mechanism 508, decryption mechanism 510, and storage mechanism 504 to perform functions that facilitate tracking queries and using tracked queries to detect, prevent, and recover from ransomware attacks. For instance, computing device 500 can execute one or more queries on processor 502 and/or LLM mechanism

508, and track such queries, the execution state of computing device 500 and the outcome of queries in decryption mechanism 510, memory 506, and/or storage mechanism 504. Program instructions executing on processor 502 can execute queries for the LLM mechanism 508, perform decryption operations for the decryption mechanism 510, and analyze and detect encryption patterns in storage mechanism 504. Note that in many embodiments, processor 502 supports executing multiple different lightweight services in a single VM using docker containers.

In some embodiments of the present invention, some or all aspects of memory 506, LLM mechanism 508, decryption mechanism 510, and/or storage mechanism 504 can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of memory 506, LLM mechanism 508, decryption mechanism 510, and/or storage mechanism 504 may be performed using general-purpose circuits in processor 502 that are configured using processor instructions. Thus, while FIG. 5 illustrates LLM mechanism 508, memory 506, decryption mechanism 510, and/or storage mechanism 504 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for recovering from a ransomware attack using computational intelligence, the method comprising:

detecting that a ransomware attack has encrypted multiple subsections of a data storage that is simultaneously being accessed by multiple processing units;

receiving a set of encryption keys that were harvested for the multiple processing units;

analyzing the contents of the data storage to determine a pattern in the multiple subsections of the data storage that have been encrypted; and using the set of encryption keys and the pattern to decrypt the encrypted multiple subsections of the data storage.

2. The computer-implemented method of claim 1, wherein the data storage is a virtual machine disk image hosted by a computing device; and wherein the virtual machine disk image is too large to be encrypted as one unit and hence is encrypted in the multiple subsections by the ransomware attack.

3. The computer-implemented method of claim 2, wherein the data storage comprises a filesystem with a known filesystem header;

wherein the filesystem is sparsely populated and hence comprises primarily unwritten, zeroed-out data values; and wherein determining the pattern comprises identifying encrypted writes in zero-out portions of the data storage to pinpoint a length of encrypted subsections and an interval between encrypted subsections.

4. The computer-implemented method of claim 3, wherein determining the pattern further comprises submitting queries to a computational intelligence and executing query responses to efficiently analyze the contents of the data storage and determine the length and the interval.

5. The computer-implemented method of claim 3, wherein it is not possible to determine the processing unit that executed the ransomware attack; and wherein decrypting the encrypted subsections of the data storage comprises:

determining that the known filesystem header has been encrypted; and testing the set of encryption keys to decrypt the encrypted filesystem header individually to determine if the encrypted multiple subsections of the data storage were encrypted only once using a single encryption key.

6. The computer-implemented method of claim 5, wherein decrypting the encrypted subsections of the data storage further comprises:

determining that the encrypted filesystem header was not encrypted using any single encryption key and that multiple instances of ransomware simultaneously encrypted one or more of the multiple subsections; and testing combinations of keys from the set of encryption keys to decrypt the encrypted filesystem header and the multiple subsections.

7. The computer-implemented method of claim 6, wherein testing combinations of keys further comprises submitting the set of encryption keys and the encrypted filesystem header to a computational intelligence in a query to determine a set of decryption techniques that can decrypt the encrypted subsections.

8. The computer-implemented method of claim 7, wherein testing combinations of keys further comprises:

positing that the same ransomware attack attacked the data storage from two or more of the multiple processing units using the same encryption technique;

prioritizing the use of multiple instances of the same decryption technique in attempts to decrypt the encrypted filesystem header to reduce the number of iterations of decryption attempts.

9. The computer-implemented method of claim 8, wherein testing combinations of keys further comprises prioritizing the Chacha and AES-GCM decryption techniques in decryption attempts.

10. The computer-implemented method of claim 9, wherein testing combinations of keys from the set of encryption keys comprises XORing two or more candidate keys together to test decrypting the encrypted filesystem header.

11. The computer-implemented method of claim 10, wherein a first subset of the set of multiple keys successfully decrypt an initial portion of the encrypted multiple subsections but do not successfully decrypt a subsequent portion of the encrypted multiple subsections;

positing that one instance of the ransomware attack may have terminated early and testing the keys of the first subset at least one of individually or in subsequent subsets to decrypt the subsequent portion.

12. A non-transitory computer-readable storage medium storing instructions that when executed by a computer cause the computer to perform a method for recovering from a ransomware attack using computational intelligence, the method comprising:

detecting that a ransomware attack has encrypted multiple subsections of a data storage that is simultaneously being accessed by multiple processing units;

receiving a set of encryption keys that were harvested for the multiple processing units;

analyzing the contents of the data storage to determine a pattern in the multiple subsections of the data storage that have been encrypted; and using the set of encryption keys and the pattern to decrypt the encrypted multiple subsections of the data storage.

13. A computing device that enhances ransomware detection accuracy using computational intelligence, comprising:

a processor that executes an operating system kernel that supports executing multiple different lightweight services in a single virtual machine using docker containers;

a decryption mechanism;

a storage mechanism; and a memory;

wherein the decryption mechanism is configured to:

detect that a ransomware attack has encrypted multiple subsections of the storage mechanism, wherein the storage mechanism is simultaneously being accessed by multiple processing units;

receive a set of encryption keys that were harvested for the multiple processing units;

analyze the contents of the data storage to determine a pattern in the multiple subsections of the storage mechanism that have been encrypted; and use the set of encryption keys and the pattern to decrypt the encrypted multiple subsections of the data storage.

* * * * *